United States Patent [19]
Chang et al.

[11] Patent Number: 6,069,775
[45] Date of Patent: May 30, 2000

[54] INVERTED MERGED MR HEAD WITH PRECISE TRACK WIDTH

[75] Inventors: Thomas Young Chang; Jyh-Shuey Jerry Lo, both of San Jose, Calif.

[73] Assignee: International Business Machines Corporation, Armonk, N.Y.

[21] Appl. No.: 08/996,433

[22] Filed: Dec. 22, 1997

[51] Int. Cl.$^7$ .................................................. G11B 5/127
[52] U.S. Cl. .......................... 360/126; 360/113; 360/122; 29/603.14; 29/603.15; 29/603.18; 216/22
[58] Field of Search .................................... 360/113, 119, 360/122, 126; 29/603.14, 603.15, 603.18; 216/22

[56] References Cited

U.S. PATENT DOCUMENTS

| | | | |
|---|---|---|---|
| 4,970,616 | 11/1990 | Ramaswamy | 360/122 |
| 5,267,112 | 11/1993 | Batra et al. | 360/119 |
| 5,283,942 | 2/1994 | Chen et al. | 29/603 |
| 5,438,747 | 8/1995 | Krounbi et al. | 29/603 |
| 5,452,164 | 9/1995 | Cole et al. | 360/113 |
| 5,555,482 | 9/1996 | McNeil | 360/125 |
| 5,649,351 | 7/1997 | Cole et al. | 29/603.14 |
| 5,805,391 | 9/1998 | Chang et al. | 360/113 |

*Primary Examiner*—William Klimowicz
*Attorney, Agent, or Firm*—Gray Cary Ware & Freidenrich LLP; Ervin F. Johnston

[57] ABSTRACT

A method makes an inverted merged MR head with a second pole tip layer which is self-aligned with a top first pole tip layer. After forming a bottom first pole tip layer, which is relatively thin and relatively wide, a top first pole tip layer is formed thereon with a width that defines the track width of the merged MR head. A second pole tip forming layer is formed on the top first pole tip layer and layers adjacent both sides of the top first pole tip layer. The forming layer and the top first pole tip layer are lapped so that their top surfaces are flush with one another. Ion milling is then implemented to mill the top first pole tip layer at a faster rate than the forming layer causing a recess that is defined by a top surface of the top first pole tip layer and inclined surfaces of the forming layer immediately adjacent thereto. After formation of a write gap layer in the recess a second pole tip layer is formed in a recess replicated by the write gap layer causing a bottom base portion of the second pole tip layer to be substantially the same width as the track width and aligned with the top first pole tip layer so that flux can be transferred between the pole tips more narrowly confined within the track width.

120 Claims, 18 Drawing Sheets

FORM I1,
COIL I2,
AND I3
FIG. 34
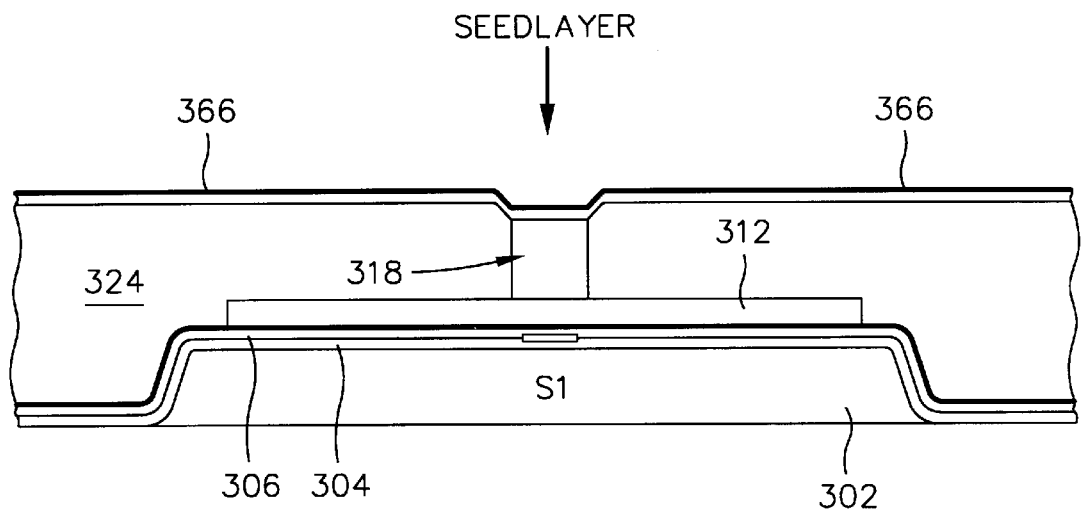
FIG. 35
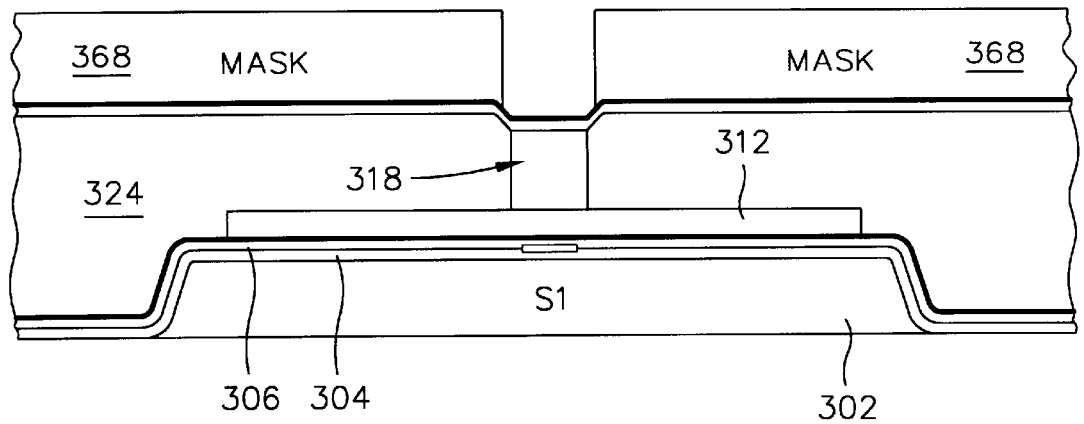
FIG. 36

INVERTED MERGED MR HEAD WITH PRECISE TRACK WIDTH

BACKGROUND OF THE INVENTION

1. Field of the Invention

The present invention relates to an inverted merged magnetoresistive (MR) head with a precise track width and more particularly to an inverted merged MR head where a top pole tip portion of a first pole piece defines the track width of the head and a pole tip of a second pole piece is shaped (similar to notching) to confine flux transfer between the pole tips substantially within the defined track width.

2. Description of the Related Art

An inductive write head includes a coil layer embedded in first, second and third insulation layers (insulation stack), the insulation stack being located between first and second pole piece layers. A gap is formed between the first and second pole piece layers by a gap layer at an air bearing surface (ABS) of the write head. The pole piece layers are connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk or longitudinal tracks on a moving magnetic tape.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium. Since magnetic flux decays as it travels down the length of the narrow second pole tip, shortening the second pole tip will increase the flux reaching the recording media. Therefore, performance can be optimized by aggressively placing the flare point close to the ABS.

Another parameter important in the design of a write head is the location of the zero throat height (ZTH). The zero throat height is the location where the first and second pole pieces first separate from one another after the ABS. ZTH separation is imposed by an insulation layer, typically the first insulation layer in the insulation stack. Flux leakage between the first and second pole pieces is minimized by locating the ZTH as close as possible to the ABS.

Unfortunately, the aforementioned design parameters require a tradeoff in the fabrication of the second pole tip. The second pole tip should be well-defined in order to produce well-defined written tracks on the rotating disk. Poor definition of the second pole tip may result in overwriting of adjacent tracks. A well-defined second pole tip should have parallel planar side walls which are perpendicular to the ABS. In most write heads the second pole tip is formed along with the yoke after the formation of the first insulation layer, the coil layer and the second and third insulation layers. Each insulation layer includes a hardbaked photoresist having a sloping front surface.

After construction, the first, second and third insulation layers present front sloping surfaces which face the ABS. The ZTH defining insulation layer rises from a plane normal to the ABS at an angle (apex angle) to the plane. The sloping surfaces of the hard-baked resist of the insulation layers exhibit a high optical reflectivity. When the second pole tip and yoke are constructed, a thick layer of photoresist is spun on top of the insulation layers and photo patterned to shape the second pole tip, using the conventional photo-lithography technique. In the photo-lithography step, ultraviolet light is directed vertically through slits in an opaque mask, exposing areas of the photoresist which are to be removed by a subsequent development step. One of the areas to be removed is the area where the second pole piece (pole tip and yoke) are to be formed by plating. Unfortunately, when the location of the flare point is placed on the sloping surfaces of the insulation layers, ultraviolet light is reflected forward, toward the ABS, into photoresist areas at the sides of the second pole tip region. After development, the side walls of the photoresist extend outwardly from the intended ultraviolet pattern, causing the pole tip to be poorly formed after plating. This is called "reflective notching". As stated hereinabove this causes overwriting of adjacent tracks on a rotating disk. It should be evident that, if the flare point is recessed far enough into the head, the effect of reflective notching would be reduced or eliminated since it would occur behind the sloping surfaces. However, this solution produces a long second pole tip which quickly reduces the amount of flux reaching the recording medium.

The high profile of the insulation stack causes another problem after the photoresist is spun on a wafer. When the photoresist is spun on a wafer it is substantially planarized across the wafer. The thickness of the resist in the second pole tip region is higher than other regions of the head since the second pole tip is substantially lower on the wafer than the yoke portion of the second pole piece. During the light exposure step the light progressively scatters in the deep photoresist like light in a body of water causing poor resolution during the light exposure step.

A scheme for minimizing the reflective notching and poor resolution problems is to construct the second pole piece of first and second components with the first component forming the second pole tip. The first component is constructed before the insulation layers to eliminate the reflective notching problem. After forming the first pole piece layer and the write gap layer, a photoresist layer is spun on the partially completed head. Ultraviolet light from the photo-patterning step is not reflected forward since the photoresist layer does not cover the insulation stack. Further, the photoresist is significantly thinner in the pole tip region so that significantly less light scattering takes place. After plating the first component the photoresist layer is removed and the first insulation layer, the coil layer and the second and third insulation layers are formed. The second component of the second pole piece is then stitched (connected) to the first component and extends from the ABS to the back gap. Since the second pole tip is well-formed, well-formed notches can be made in the first pole piece, as discussed hereinafter. However, with this head, the ZTH is dependent upon the location of the recessed end of the first component. Since the first component has to be long enough to provide a sufficient stitching area, this length may result in undesirable flux leakage between the first and second pole pieces. Further, the second pole piece component extends to the ABS. Since the second component is typically wider than the first component, as viewed at the ABS, the second pole piece has a T-shape. The upright portion of the T is the front edge of the first component of the second pole piece, and the cross of the T is the front edge of the second component. A problem with this configuration is that during operation, flux fringes from the outer corners of the second component to the first pole piece, causing adjacent tracks to be overwritten.

Once the second pole tip is formed, it is desirable to notch the first pole tip opposite the first and second corners at the base of the second pole tip so that flux transfer between the pole tips does not stray beyond the track width defined by the second pole tip. Notching provides the first pole piece with a track width that substantially matches the track width of the second pole piece. A prior art process for notching the first pole piece entails ion beam milling the gap layer and the first pole piece, employing the second pole tip as a mask. The gap layer is typically alumina and the first and second pole pieces and pole tips are typically Permalloy (NiFe). The alumina mills more slowly than the Permalloy; thus the top of second pole tip and a top surface of the first pole piece are milled more quickly than the gap layer. Further, during ion milling, there is much redeposition (redep) of alumina on surfaces of the workpiece. In order to minimize redep, the milling ion beam is typically directed at an angle to a normal through the layers, which performs milling and cleanup simultaneously. The gap layer in the field remote from the first and second corners of the second pole piece is the first to be milled because of a shadowing effect at the first and second corners caused by the second pole tip when the ion beam is angled. In this case, the ion stream will overmill the first pole piece before the gap layer is removed adjacent the first and second corners of the second pole tip in the region where the notching is to take place. After the gap layer is removed above the sites where the notching is to take place, ion milling continues in order to notch the first pole piece. Overmilling of the first pole piece continues to take place in the field beyond the notches, thereby forming surfaces of the first pole piece that slope downwardly from the notches. As is known, such overmilling of the first pole piece can easily expose leads to the MR sensor, thereby rendering the head inoperative.

Even if overmilling of the first pole piece can be controlled, there is potentially a more troublesome problem, namely overmilling the top of the second pole tip when the unwanted portions of the gap layer are milled and notches are formed. In order to compensate for this overmilling, the aspect ratio (ratio of thickness of photoresist to track width of second pole tip) is increased so that a top portion of the top of the second pole tip can be sacrificed during the milling steps. When the aspect ratio is increased, definition of the second pole tip is degraded because of the thickness of the photoresist, discussed hereinabove, resulting in track overwriting.

In order to minimize overmilling of the first pole piece, another process removes the gap layer, except for a desired portion between the first and second pole tips, by a wet etchant. After the unwanted portions of the gap layer are removed, the first pole piece is ion milled, employing the second pole tip as a mask. The only overmilling of the first pole piece is due to the ion milling of the notches at the first and second corners of the gap layer. This process also eliminates significant redep of the alumina. A problem with this process, however, is that the etching undercuts the gap layer under the base of the second pole tip which is a critical area for the transfer of field signals. The undercut regions provide spaces which can be filled with Permalloy redeposited during subsequent ion milling of the first pole piece or redep of other foreign material upon subsequent milling and clean up steps.

Still another process proposes plating the top and first and second side walls of the second pole tip with a protective metal layer before etching the unwanted portions of the gap layer. When the etching reaches the inside thickness of each protective metal layer, the process is stopped so that the gap layer is not undercut under the base of the second pole tip. It is proposed that the protective metal layer remain in the head because of the difficulty of removing it. Disadvantages of this process are the difficulty of the plating step and the potential of the protective metal layer interfering with the magnetics of the second pole tip.

Another problem with the prior art merged MR head is that the profile of the MR sensor between the first and second gap layers is replicated through the second shield/first pole piece layer to the write gap layer causing the write gap layer to be slightly curved concave toward the MR sensor. When the write head portion of the merged MR head writes data the written data is slightly curved on the written track. When the straight across MR sensor reads this curved data there is progressive signal loss from the center of the data track toward the outer extremities of the data track.

Accordingly, there is a strong-felt need to provide an inductive write head portion of a merged MR head wherein a highly defined track width defining pole tip can be formed without reflective notching and curved written data problems.

SUMMARY OF THE INVENTION

The aforementioned reflective notching problem is obviated by an inverted write head portion of the merged MR head. Similar to the prior art write head the inverted write head includes first and second pole pieces that are connected at a back gap and that are separated by a gap layer at the ABS. The first pole piece has first and second layers that terminate as bottom and top pole tips respectively at the ABS and the second pole piece has a single second pole piece layer that terminates as a second pole tip at the ABS. The top first pole tip is located between the bottom first pole tip and the second pole tip. Each of the bottom and top first pole tips and the second pole tip have an ABS edge at the ABS that has a width. The inverted write head differs from the prior art write head in that the width of the ABS edge of the top first pole tip defines a track width of the write head. This width is less than the width of the ABS edge of the bottom first pole tip.

Since the top first pole tip defines the track width, the reflective notching problem is overcome. The first and second layers of the first pole piece are constructed before construction of the insulation stack thereby obviating light reflection into the pole tip region. The first layer of the first pole piece is a flat layer. The second layer of the first pole piece layer is also a flat layer and is constructed on the first layer. Accordingly, photoresist photo-patterning produces a thin photoresist layer for the mask which provides good resolution. Since the second pole piece layer is constructed subsequent to the insulation stack light will be reflected into the pole tip region of the second pole piece layer during its construction.

With the present method of making the inverted MR head, the second pole tip has a wide ABS edge as compared to the ABS edge of the top first pole tip. An ABS view of these edges resembles a T which is similar to the inverted T formed by ABS edges of the first and second pole tips in the prior art merged MR head. As stated hereinabove, the first pole piece in the prior art write head is typically notched immediately below the pedestal type second pole tip so that flux will be transferred between the pole tips substantially within the track width defined by the second pole tip. The present invention provides a method of making a novel inverted merged MR head wherein the second pole tip is configured, similar to notching, so that flux will be transferred between the top first and second pole tips substantially within the track width defined by the top first pole tip.

More specifically, the second pole tip is provided with a base that is substantially the same size and is aligned with the top of the top first pole tip and with tapered edges that slope upwardly from the base to vertical side edges of the second pole tip. While the tapered edges are in contrast to the vertical edges formed in the prior art first pole piece, the performances are substantially the same. In the present invention, a narrow pedestal-type top first pole tip is located on a wide bottom first pole tip and the second pole tip is directly above and aligned with the top first pole tip. A gap layer separates the top of the top first pole tip from the base of the second pole tip and has a recess that is filled with the second pole tip.

In the present method the bottom first pole tip is formed with a width W1 at the ABS. The top first pole tip is formed on the bottom first pole tip with a width W2 at the ABS. The width W2 is less than the width W1 and defines the track width of the write head. A thick non-magnetic non-conductive forming layer for forming the second pole tip is formed on the bottom and top first pole tips. The forming layer substantially replicates the profiles of the bottom and top first pole tips. Because of the high profile of the top first pole tip the pole tip forming layer has a high profile above the top first pole tip. The next step is to lap the pole tip forming layer until it is flat with the top of the top first pole tip. The top of the first pole tip and the pole tip forming layer are then milled by ion milling. The rate of milling of the material of the top first pole tip is greater than the rate of milling the material of the forming layer. In the preferred embodiment the top first pole tip is nickel iron and the forming layer is alumina. The milling causes the top of the top first pole tip to be recessed below the forming layer and causes the forming layer to have tapered edges that slope upwardly from the top of the top first pole tip. The top of the top first pole tip and the tapered edges of the forming layer form a recess. The write gap layer is formed in the recess and, because of replication, has a recess. The write gap layer is very thin, such as 0.1 to 0.5 $\mu$m. The recess is preferably very shallow, such as 250–500 nm. The second pole tip is formed in the recess of the write gap layer. As stated hereinabove, the base of the second pole tip is substantially the same width as the top of the top first pole tip and is aligned therewith by a self aligning aspect of the method of making. Further, the second pole tip has upwardly sloping edges that are similar to notching as described hereinabove. The slope of the sloping edges of the second pole tip are less than 90°, such as 45°. The upwardly sloping edges of the of the second pole tip may merge with vertical side edges that define the width of the second pole tip. The width of the second pole tip, after the slope, may be 1–3 $\mu$m wider than the width (track width) of the top first pole tip.

The second pole tip is constructed after constructing the insulation stack and one or more coil layers. As stated hereinabove, this will cause reflective notching if the second pole piece layer has a flare. Even though the second pole tip is notched by reflective notching this will not affect the performance of the write head since the portion of the second pole tip immediately above the top first pole tip will be well formed by the above described method. Reflective notching of the second pole tip beyond its well-formed portion will not affect flux transfer between the pole tips. Further, even though a photoresist mask employed for making the second pole tip may not be aligned with the top first pole tip, the flux transferring portion of the second pole tip is aligned with the top first pole tip by the method of making.

Further, it should be noted that the method of making obviates the problem of the write head writing curved data tracks. In the prior art head the profile of the MR sensor is replicated by the write gap because the layers are constructed on top of each other without planarization. In the present method the lapping step planarizes the top of the top first pole tip thereby eliminating any curve replicated by the top first pole tip.

While the head is preferably a merged MR head where the second shield layer of the read head portion also serves as the bottom first pole tip of the write head portion, the invention also includes a piggyback head wherein the second shield layer and the bottom first pole tip are separate layers. Further, while the magnetic disk preferably rotates in a direction so that the second pole tip is the last pole tip to pass the written track the invention also includes a disk drive wherein the top first pole tip is last pole tip to pass the written track.

An object of the present invention is to provide a method of making a combined magnetic inverted write and read head wherein the base of a second pole tip has substantially the same width as the width of the track width defining top first pole tip and is aligned therewith.

Another object is to provide a method of making an inverted merged MR head wherein a second pole tip is self aligned with a top first pole tip.

A further object is to provide a method of making an inverted merged MR head wherein the write gap layer is straight instead of being curved.

A still another object is to provide a method of making an inverted merged MR head wherein a base of a second pole tip is substantially notched by sloping edges adjacent side edges of a top first pole tip for confining flux transfer substantially between the track width defined by the top first pole tip.

A still further object of the present invention is to provide a combined magnetic inverted write and read head wherein the base of a second pole tip has substantially the same width as the width of the track width defining top first pole tip and is aligned therewith.

A still another object is to provide an inverted merged MR head wherein a second pole tip is self aligned with a top first pole tip.

A still further object is to provide an inverted merged MR head wherein the write gap layer is straight instead of being curved.

A still another object is to provide an inverted merged MR head wherein a base of a second pole tip is substantially notched adjacent side walls of a top first pole tip for confining flux transfer substantially between the track width defined by the top first pole tip.

Other objects and advantages of the invention will be more greatly appreciated upon reading the following description taken together with the accompanying drawings.

BRIEF DESCRIPTION OF THE DRAWINGS

FIG. 34 is a block diagram illustrating formation of a first insulation layer one or more coil layers and second and third insulation layers;

FIG. 35 is the same as FIG. 33 except a seedlayer has been deposited on the write gap layer;

FIG. 36 is the same as FIG. 35 except a photoresist mask has been formed for the formation of the second pole tip layer;

DESCRIPTION OF THE PREFERRED EMBODIMENTS

Magnetic Disk Drive

Figure 1:
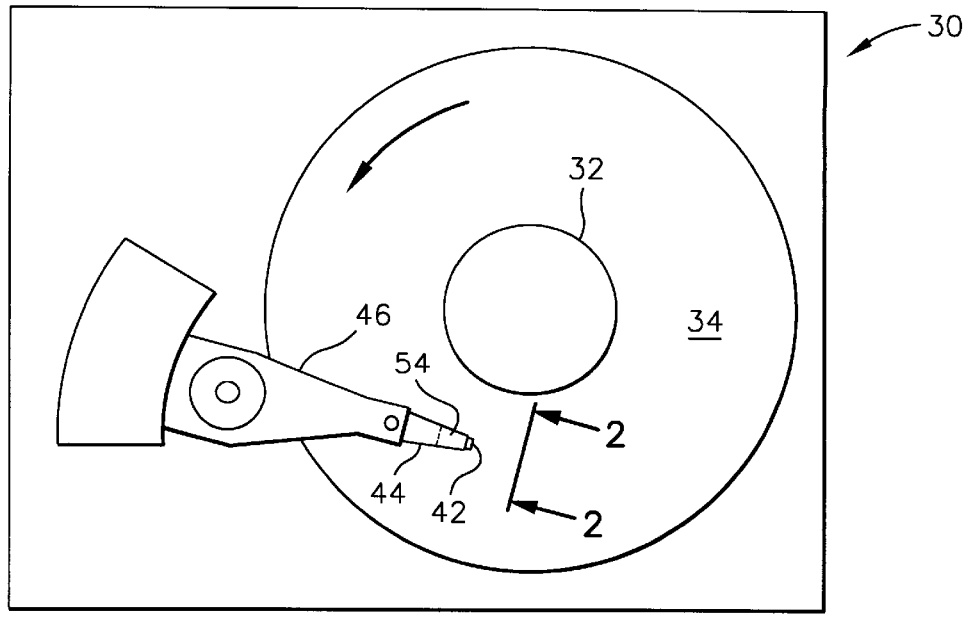
FIG. 1 is a planar view of an exemplary magnetic disk drive.
Figure 2:
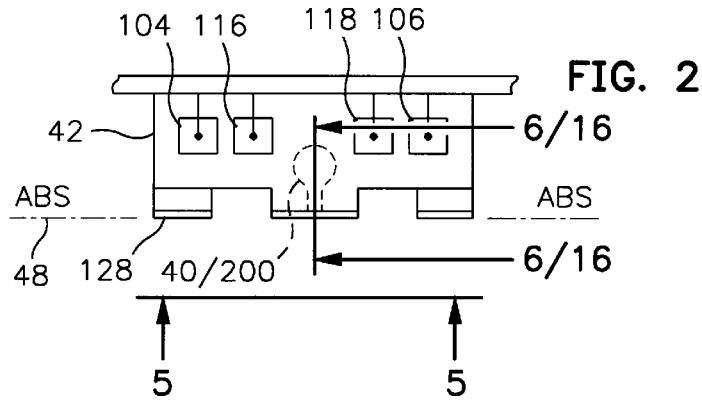
FIG. 2 is an end view of a slider with a magnetic head of the disk drive as seen in plane 2—2.
Figure 3:
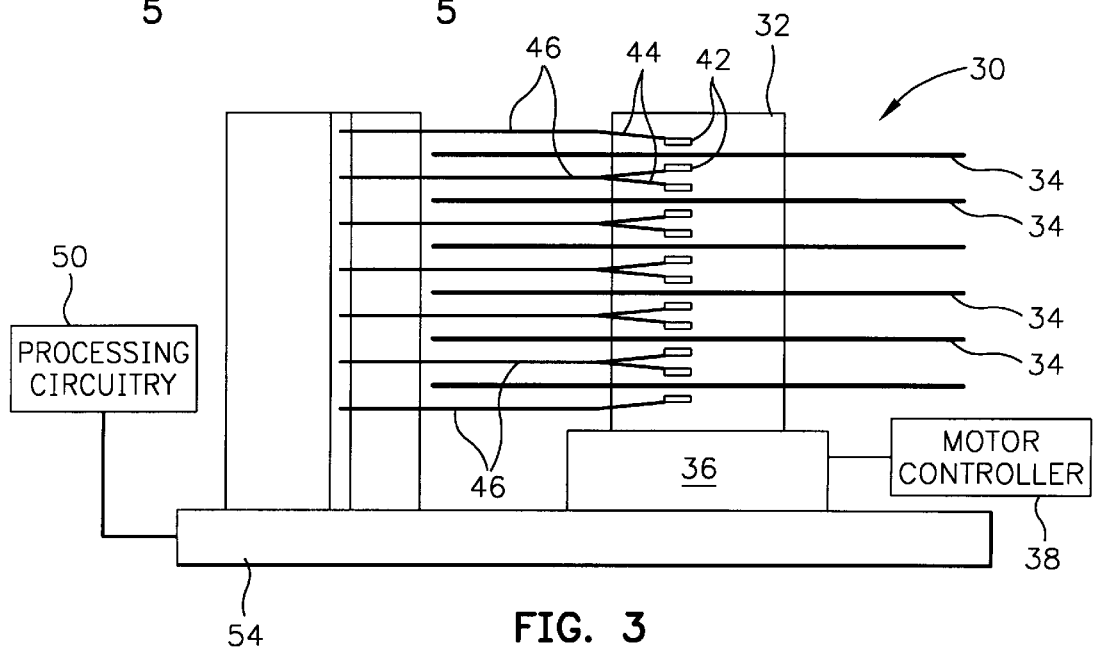
FIG. 3 is an elevation view of the magnetic disk drive wherein multiple disks and magnetic heads are employed.
Figure 4:
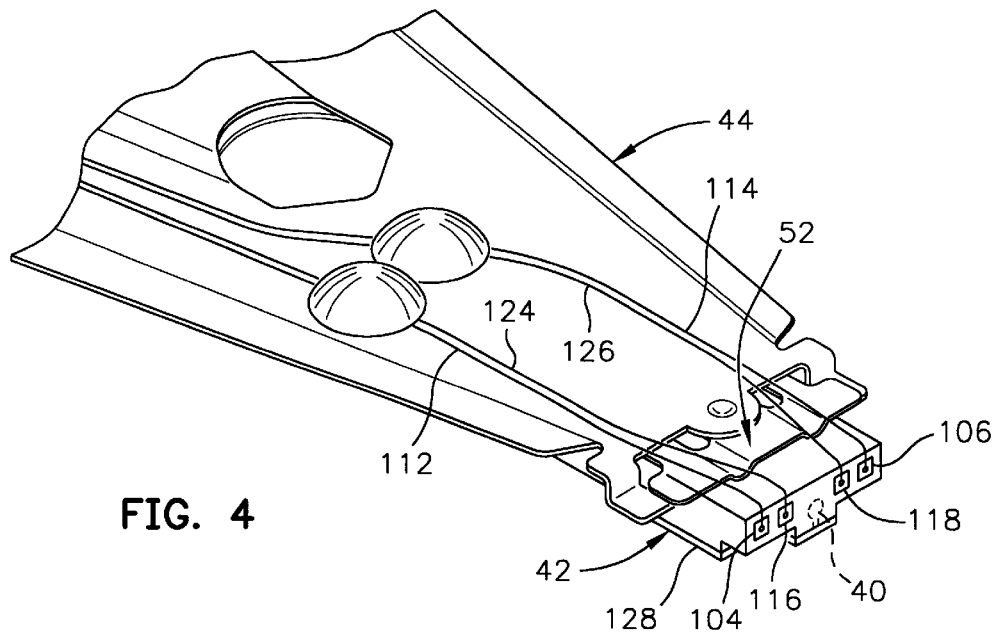
FIG. 4 is an isometric illustration of an exemplary suspension system for supporting the slider and magnetic head.

Referring now to the drawings wherein like reference numerals designate like or similar parts throughout the several views there is illustrated in FIGS. 1–3 a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to a head gimbal assembly (HGA) 52 which, in turn, is mounted to the suspension 44. The components described hereinabove may be mounted on a frame 54, as shown in FIG. 3.

Figure 5:
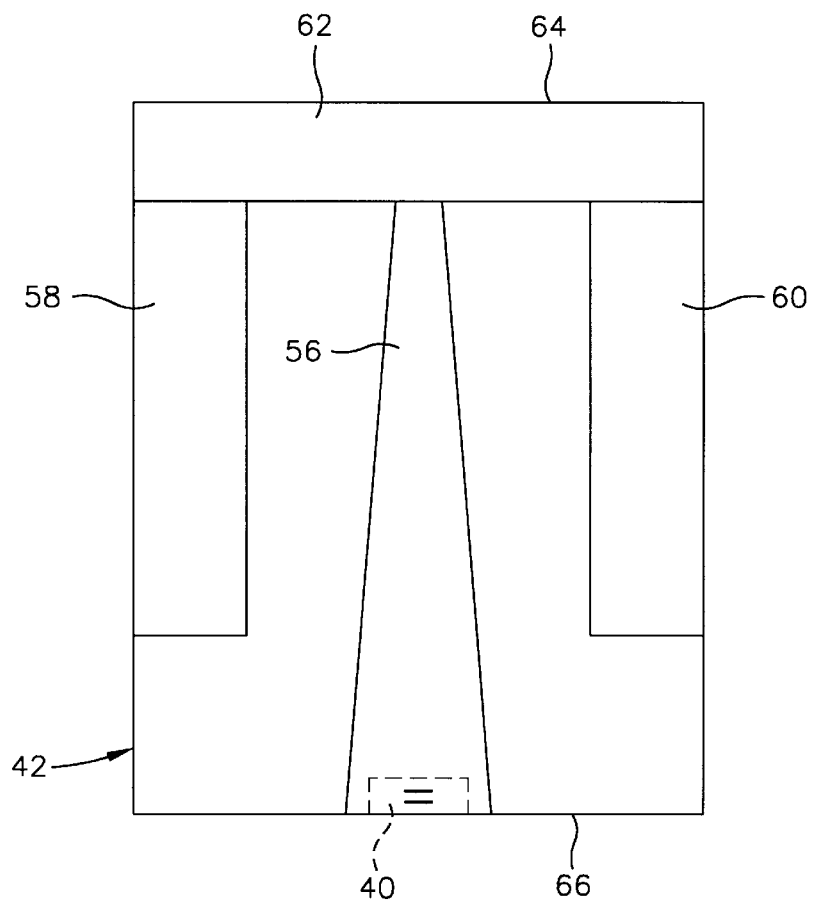
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
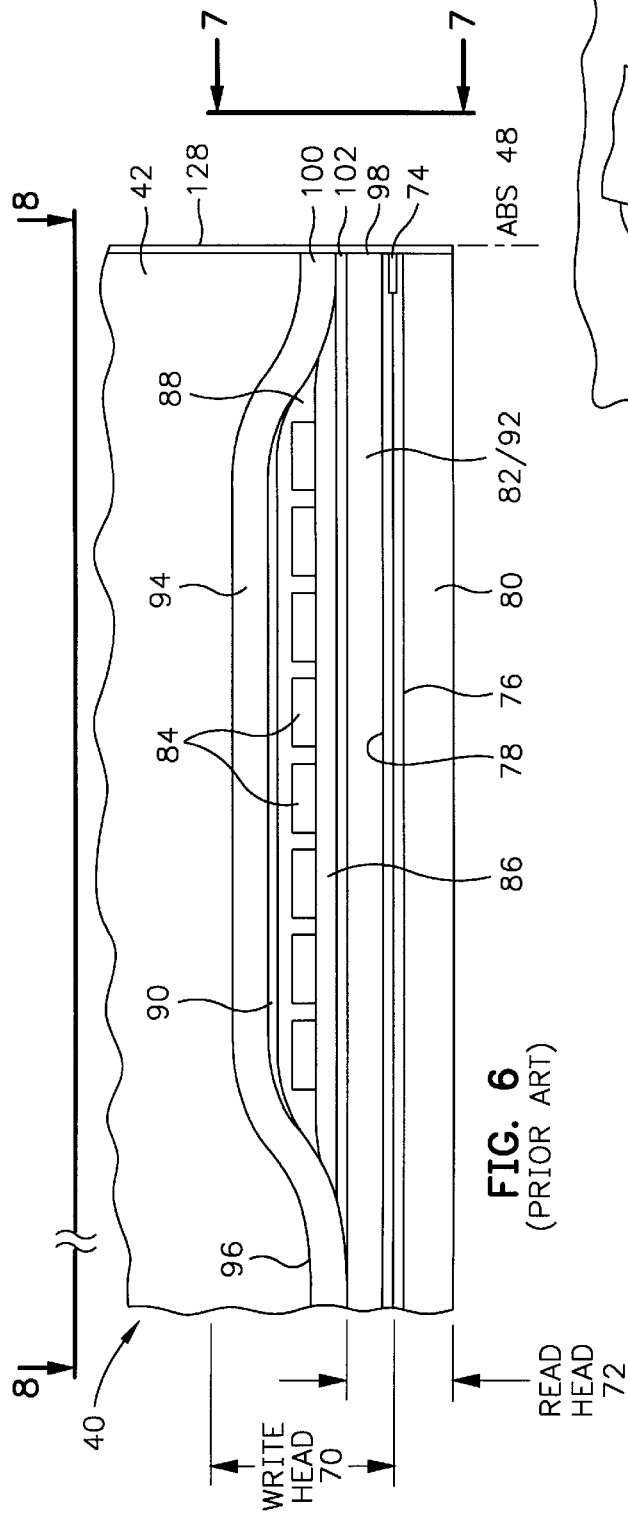
FIG. 6 is a partial view of the slider and a prior art magnetic head as seen in plane 6—6 of FIG. 2.
Figure 7:
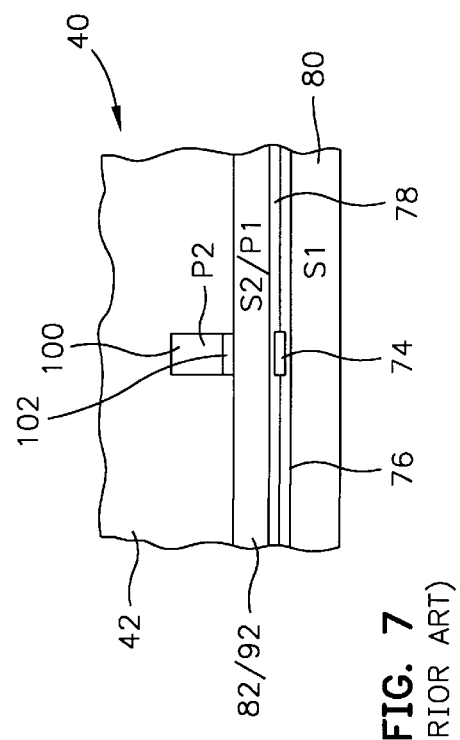
FIG. 7 is a partial ABS view of the slider taken along plane 7—7 of FIG. 6 to show the read and write elements of the prior art magnetic head.

FIG. 6 is a side cross-sectional elevation view of the merged MR head 40 which has a prior art write head portion 70 and a read head portion 72, the read head portion employing an MR sensor 74. FIG. 7 is an ABS view of FIG. 6. The sensor 74 is located between first and second gap layers 76 and 78 and the gap layers are located between first and second shield layers 80 and 82. In response to external magnetic fields, the resistance of the sensor 74 changes. A sense current $I_S$ conducted through the sensor causes these resistance changes to be manifested as potential changes. These potential changes are then processed as readback signals by the processing circuitry 50 shown in FIG. 3.

Prior Art Magnetic Write Head

Figure 8:
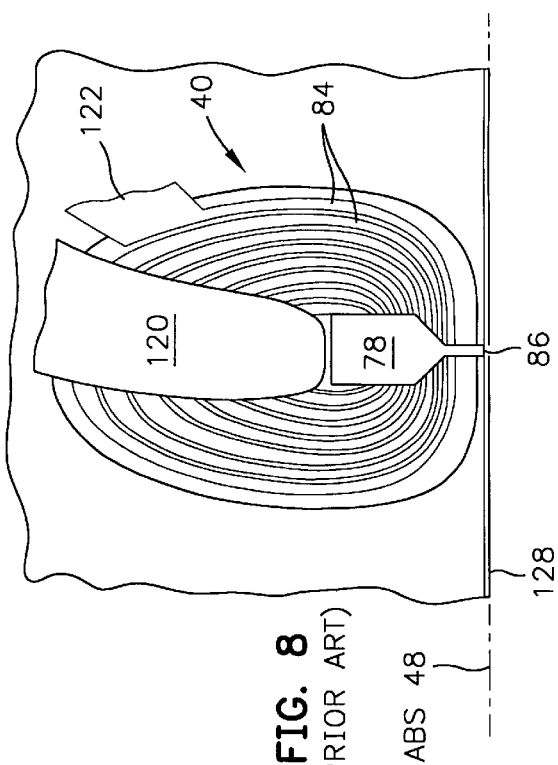
FIG. 8 is a view taken along plane 8—8 of FIG. 6 with all material above the second pole piece removed.

The prior art write head portion of the merged MR head includes a coil layer 84 located between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are located between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads from the sensor 74 to leads 112 and 114 on the suspension 44 and third and fourth solder connections 116 and 118 connect leads 120 and 122 from the coil 84 (see FIG. 8) to leads 124 and 126 on the suspension. A wear layer 128 may be employed for protecting the sensitive elements of the magnetic head, as shown in FIGS. 2, 4, 6 and 7. It should be noted that the merged MR head 50 employs a single layer 82/92 to serve a double function as a second shield layer for the read head and as a first pole piece for the write head. A piggyback MR head employs two separate layers for these functions.

Figure 9:
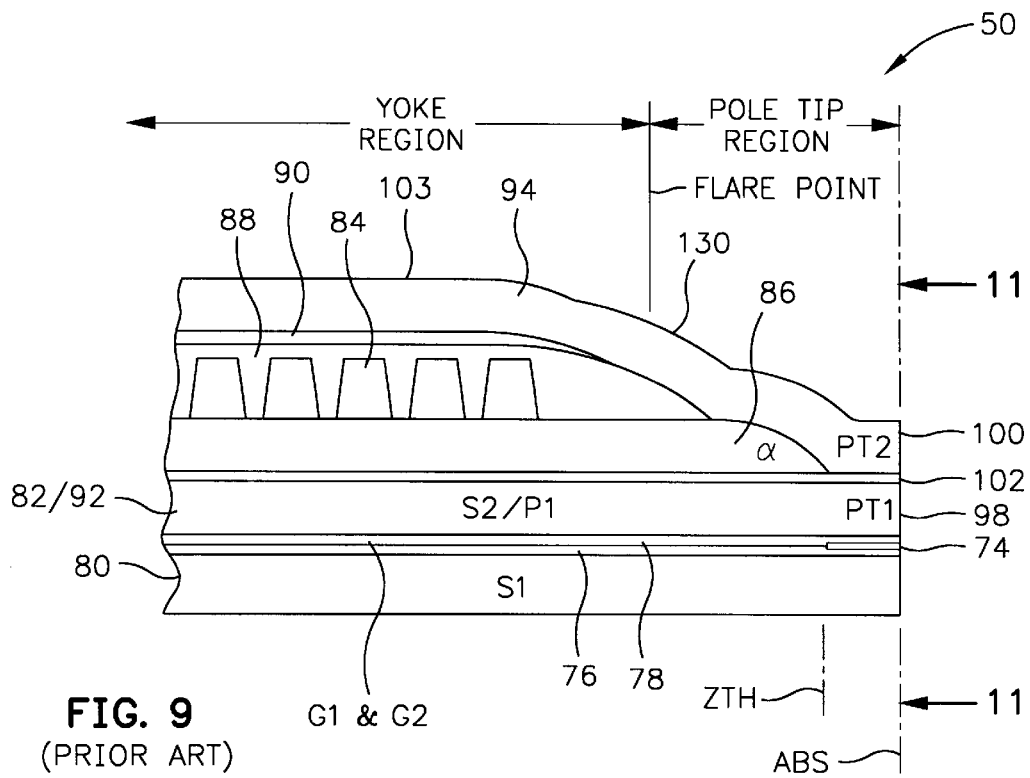
FIG. 9 is an enlarged front portion of the prior art magnetic head of FIG. 6 to show various details thereof.
Figure 12:
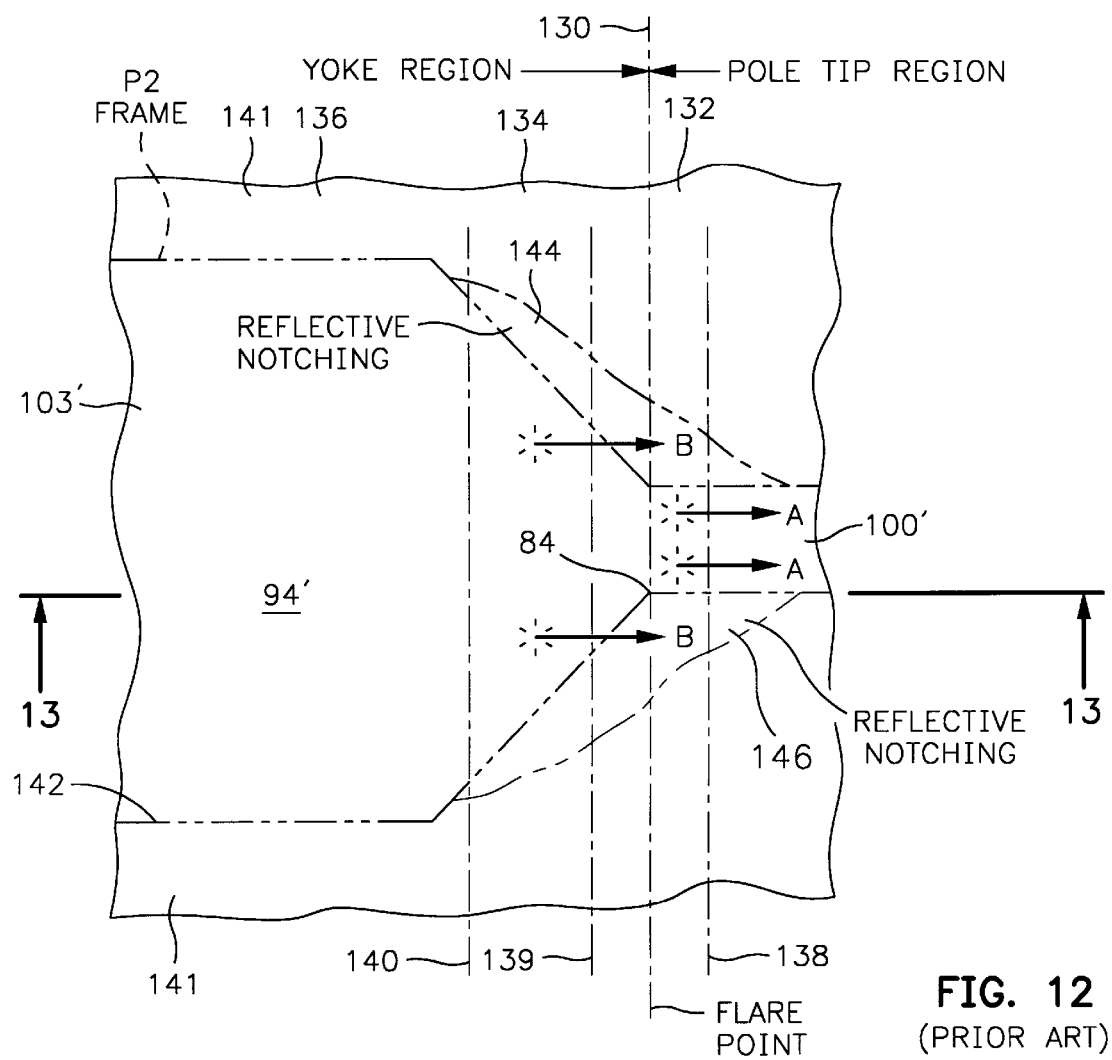
FIG. 12 is a view taken along plane 12—12 of FIG. 10.

As shown in FIG. 9, the second pole piece layer 94 has a pole tip region and a yoke region, the merging of these components being defined by a flare point 130 which is the location where the second pole piece layer 74 begins to widen as it recesses in the head. The second pole tip region extends from the ABS to the flare point 130, and the yoke region extends from the flare point 130 to the back gap 96 (see FIG. 6). In FIG. 12 are shown the pole tip region, the yoke region and the flare point 130 as defined by a photoresist mask (P2 frame).

Figure 13:
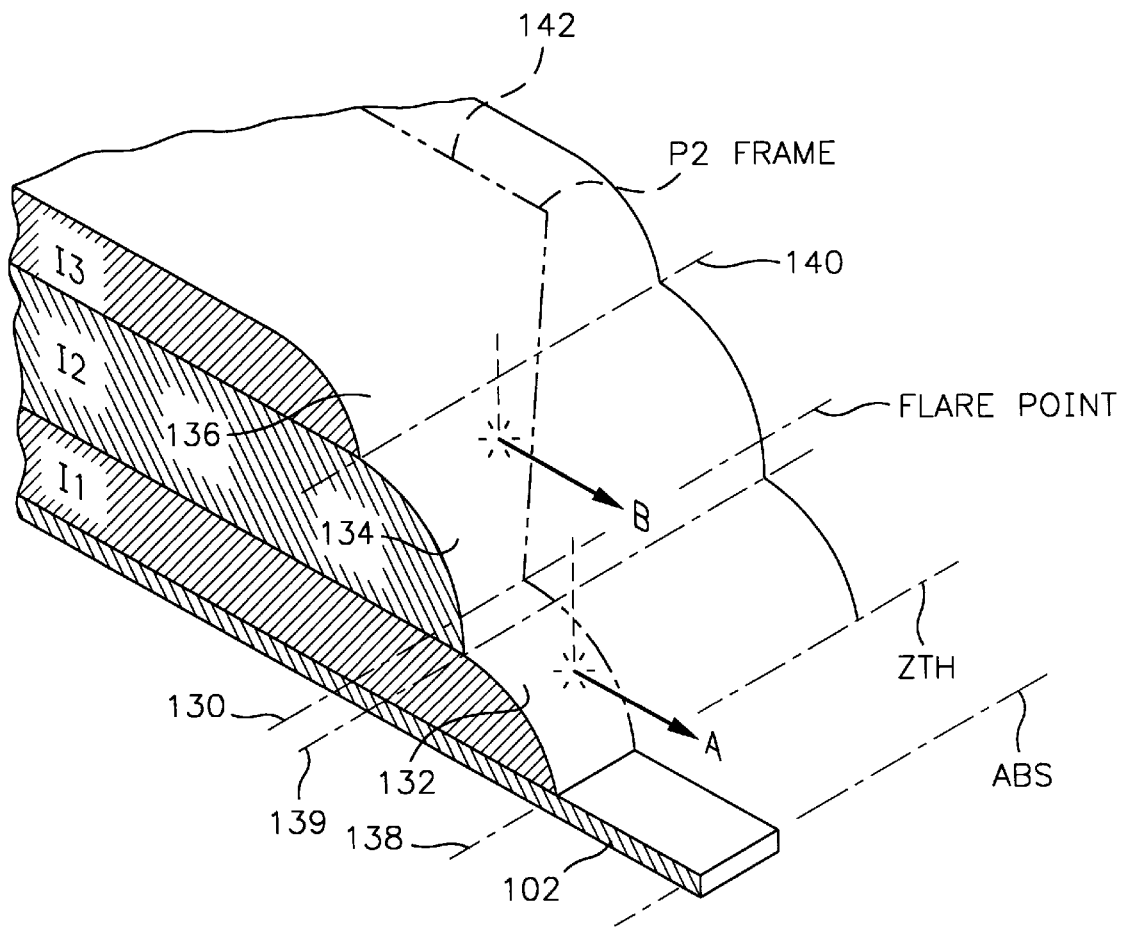
FIG. 13 is an isometric illustration of FIG. 10 without the P2 photoresist.

The location of the flare point 130, shown in FIGS. 9, 12 and 13, is an important design parameter of the write head. The further the flare point is recessed into the head, the longer the pole tip 100, which increases magnetic inductance and the likelihood that the pole tip 100 will saturate in response to flux from the coil layer 84. In the past it has been difficult to locate the flare point closer to the ABS than 10 μm because of a fabrication problem in making the second pole tip.

Another important design parameter in making the write head is the location of a zero throat height (ZTH), which is where the first and second pole piece layers 92 and 94 first separate from one another behind the ABS. It is important to locate the ZTH as close as possible to the ABS (typically within about 1 μm) in order to reduce flux loss between the pole pieces before the fields reach the gap layer 102 at the ABS. In the prior art, locating the ZTH close to the ABS contributed to the aforementioned problem of fabricating a well-defined second pole tip 100.

Figure 10:
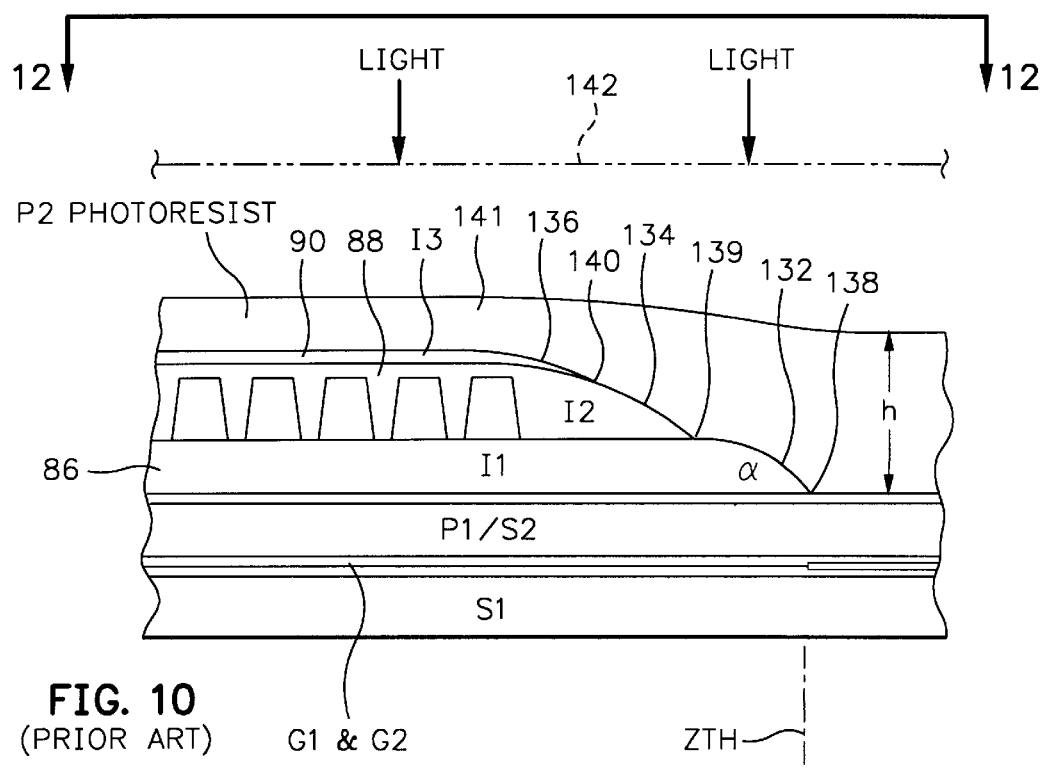
FIG. 10 is the same as FIG. 9 except a photo-patterning step is illustrated for constructing the second pole tip of the magnetic head.

FIG. 10 shows the prior art head of FIG. 9 during the step of constructing the second pole piece 94 (see FIG. 9). In FIG. 10 the first, second and third insulation layers 86, 88 and 90 are shown with sloping surfaces 132, 134 and 136 respectively, which terminate at apexes 138, 139 and 140 respectively. As stated hereinabove, the first, second and third insulation layers are hard-baked photoresist which results in the sloping surfaces 132, 134 and 136 being highly reflective to light. All of the sloping surfaces 132, 134 and 136 face the pole tip region where the second pole tip 100 of the second pole piece 94 is to be formed. As shown in FIG. 10, the second pole piece is formed with a photoresist layer 141 that is spun on top of the partially completed head. The height of the photoresist layer may be as much as 12 μm thick in the pole tip region and is typically approximately 4.5 μm thick above the third insulation layer 90 Since the flare point 130 of the second pole piece 94 (shown in FIGS. 9, 12 and 13) is located on the sloping surfaces of the insulation layers, light directed through a second pole-shaped opening (not shown) in a mask 142 will be reflected from the sloping surfaces forward toward the ABS into areas of the photoresist layer 141 adjacent the pole tip region. This causes the pole tip region to be wider than the opening in the mask 142. This is referred to as "reflective notching" and is illustrated in FIG. 12.

The photoresist pattern for the second pole piece is shown in FIG. 12 at 94' which comprises the second pole tip pattern 100' and the second pole piece yoke pattern 103'. This is referred to as the "P2 frame". Reflective notching of the photoresist layer 141 (see FIG. 10) by light reflected at an angle of incidence from the sloping layers of the insulation layers is shown at 144 and 146 in FIG. 12. When light ray A is directed downwardly during the photo-imaging step of the photoresist it is reflected at an angle of incidence from the insulation stack into the pole tip region without causing any reflective notching of the second pole tip. However, light ray B from the photo-imaging process is reflected from the sloping surfaces of the insulation layers behind the flare point 130 at an angle of incidence into the photoresist 141 in a side region outside the intended pole tip pattern 100'. It is light reflection B and similar light reflections that cause the reflective notching shown in FIG. 12.

Figure 11:
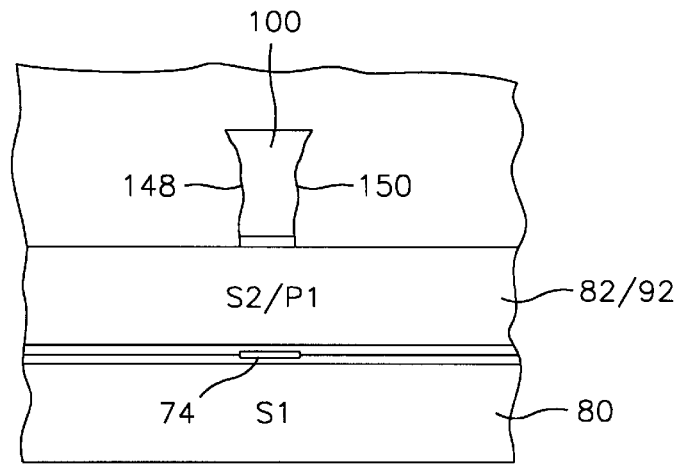
FIG. 11 is a view taken along plane 11—11 of FIG. 9.

When the second pole piece 94 is plated and the photoresist layer 141 is removed the head is complete, as shown in FIG. 9. However, the pole tip 100 is poorly formed, exhibiting irregular side walls 148 and 150, as shown in FIG. 11. Furthermore, photoresist notching results in a second pole tip 100 that has wider areas at the upper pole tip region than at the base of the pole tip (adjacent the write gap). If the irregular second pole tip 100 is used as a milling mask to notch the first pole tip 98, the wider regions of the second pole tip shadows the milling beam. Thus, the milling process is less effective at removing the first pole tip material directly beneath the side walls of the second pole tip. This results in a poorly formed P1 notched write head structure due to incomplete notching of the first pole piece 72. These poorly formed pole tips result in side writing of adjacent tracks.

Figure 14:
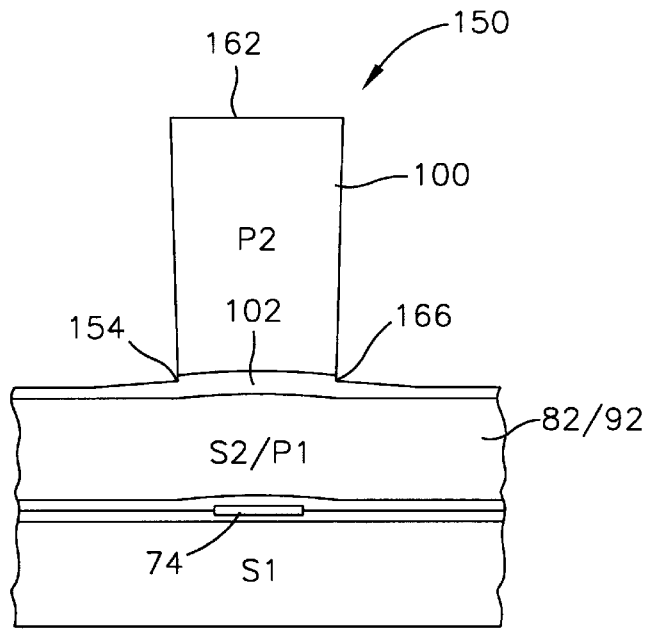
FIG. 14 is an ABS view of a prior art merged MR head before notching of the first pole piece.
Figure 15:
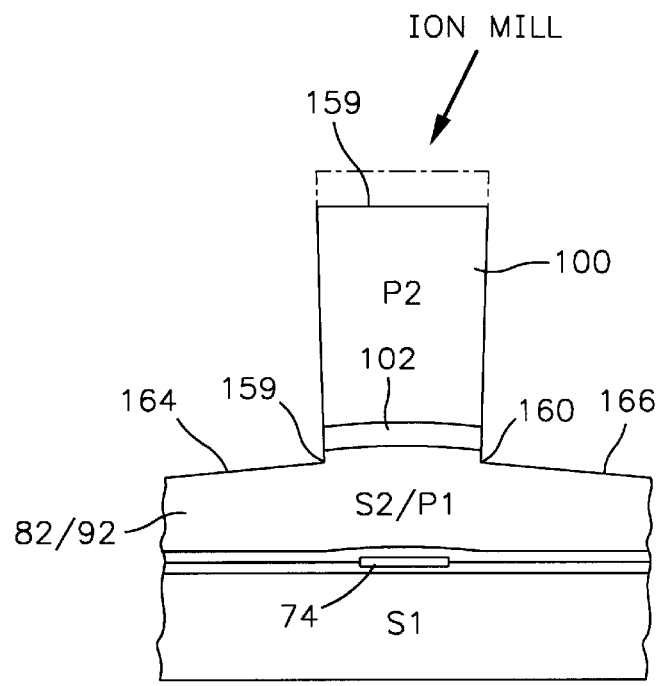
FIG. 15 is an ABS view of the merged MR head shown in FIG. 14 after ion milling to form the first pole piece with notches adjacent the second pole tip.

FIG. 14 is an ABS view of a prior art merged magnetic head 150 after a P2 seedlayer (not shown) has been removed by ion milling. It can be seen that the ion milling has slightly notched the gap layer 102 at 154 and 156. One method of notching the first pole piece layer 82/92 in the prior art is to ion mill through the gap layer into the first pole piece layer, as shown in FIG. 15. This notches the first pole piece layer at 159 and 160. Notching of the first pole piece layer 82/92 is desirable since it minimizes side writing between the second pole tip 100 and the first pole piece 82/92. Unfortunately, the process shown in FIG. 15 results in consumption of a top surface 159 of the second pole tip 100, as shown by the phantom lines in FIG. 15. Since ion milling is typically performed at an angle to a normal to the thin film layers, as shown in FIG. 15, the second pole tip 158 shadows the milling of the notching at 159 and 160 approximately 50% of the time while the workpiece is rotated.

Consequently, the first pole piece 82/92 is overmilled in locations 164 and 166 which extend in the field remote from the notches 159 and 160 respectively. This causes the first pole piece 82/92 to have downwardly sloping top surfaces 164 and 166, as shown in FIG. 15, which undesirably reduces the thickness of the first pole piece 82/92 in the field. This can potentially expose sensitive elements beneath the first pole piece 82/92 rendering the head inoperative. The gap layer 102 mills more slowly than the Permalloy (NiFe) of the first and second pole pieces which results in more rapid ion milling of the top 159 of the second pole tip 100 and the fields 164 and 166 of the first pole piece 82/92 than the gap layer 102.

It can be seen from FIG. 15 that the beginning thickness of the second pole tip layer 100 has to be thicker than the final height of the second pole tip layer at 159 in order to compensate for the top portion of the second pole tip layer consumed by ion milling. This then requires the photoresist mask to be thicker which increases the aforementioned problem of additional light scattering during the light photo-imaging step as the photoresist layer increases in depth. This means that the second pole tip cannot be constructed as narrow because of loss of definition during the photoresist patterning. FIG. 15 also shows the write gap 102 slightly curved due to the profile of the MR sensor being replicated through the second shield first pole tip layer 82/92 to the gap layer 102. Accordingly, it can now be seen that the prior art merged MR head suffers from the disadvantages of reflective notching of the second pole tip, loss of a top portion of the second pole tip upon notching the first pole piece and write gap curvature. These problems are overcome by the inverted merged MR head described hereinbelow.

Another problem with the prior art head in FIGS. 14 and 15 is that the write gap 102 has a curvature due to replication of the profile of the MR sensor by the second gap layer 78 and the second shield/first pole piece layer 82/92. As discussed hereinabove, this causes information to be written in a curve across a track which is inaccurately read by the straight MR sensor 74.

Inverted Merged MR Head

Figure 16:
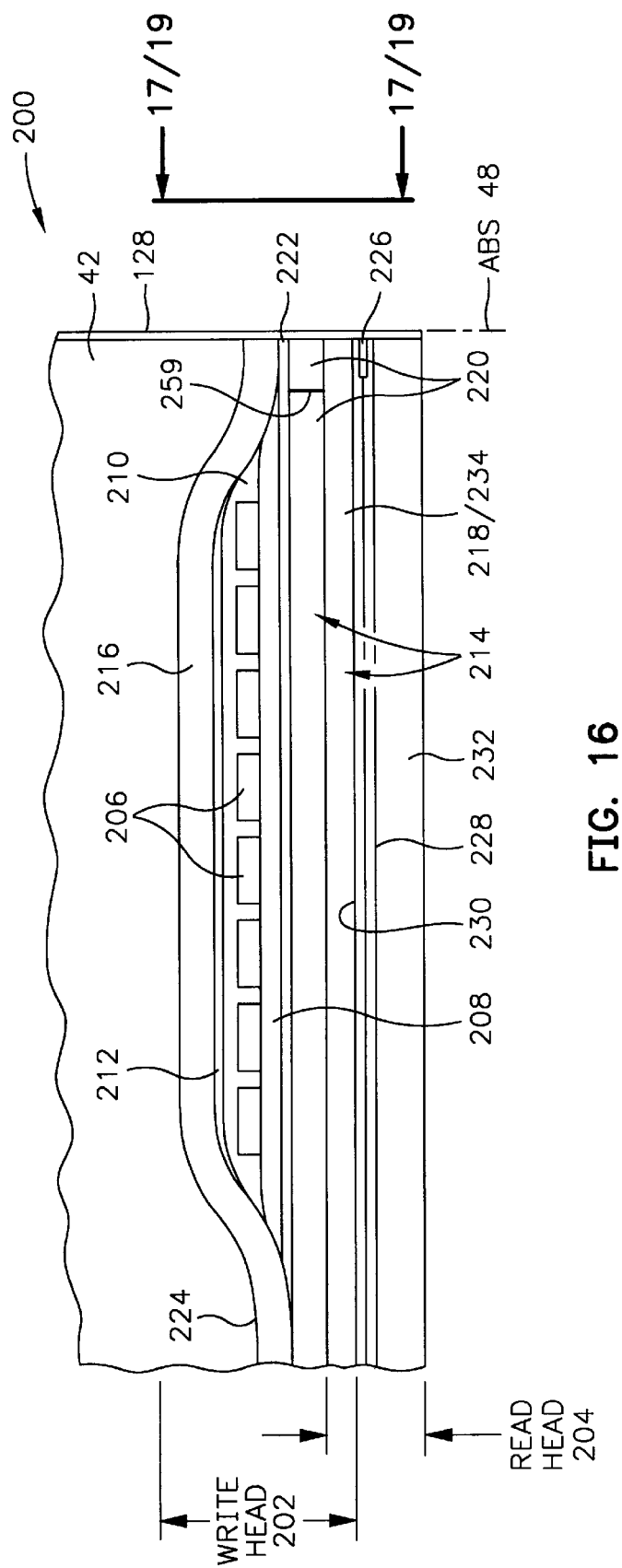
FIG. 16 is a longitudinal cross-sectional view of a portion of an inverted merged MR head which employs the present invention.

FIG. 16 is a longitudinal cross-sectional illustration of an inverted magnetic write head 200 which has a write head portion 202 and a read head portion 204. The write head portion 202 includes a coil layer 206 that is located between first and second insulation layers 208 and 210. A third insulation layer 212 may be employed for planarizing the head to eliminate ripples in the second insulation layer caused by the one or more coil layers 206. The first, second and third insulation layers are referred to as an "insulation stack". The coil layer 206 and the first, second and third insulation layers 208, 210 and 212 are located between first acid second pole pieces 214 and 216. The first pole piece 214 includes first and second pole piece layers 218 and 220 which will distinguish the inverted write head from the previously described prior art write head, as described in more detail hereinafter. The second layer 220 of the first pole piece is separated from the second pole piece layer 216 by a write gap layer 222 at the ABS. The second layer 220 of the first pole piece and the second pole piece layer 216 may be connected at a back gap 224.

A read sensor 226, which may be an anisotropic magnetoresistive (AMR) sensor or a spin valve sensor, is located between first and second gap layers 228 and 230 which are, in turn, located between first and second shield layers 232 and 234. In the preferred merged MR head the first layer 218 of the first pole piece and the first shield layer 234 are a common layer. In an optional piggyback head these are separate layers. It should be noted from FIG. 16 that edges of each of the MR sensor 226, the first and second layers 218 and 220 of the first pole piece and the second pole piece layer 216 form a portion of the ABS 48. The inverted write head 200 is embedded in the body of the slider 42 as shown in FIGS. 16 and 2.

Figure 17:
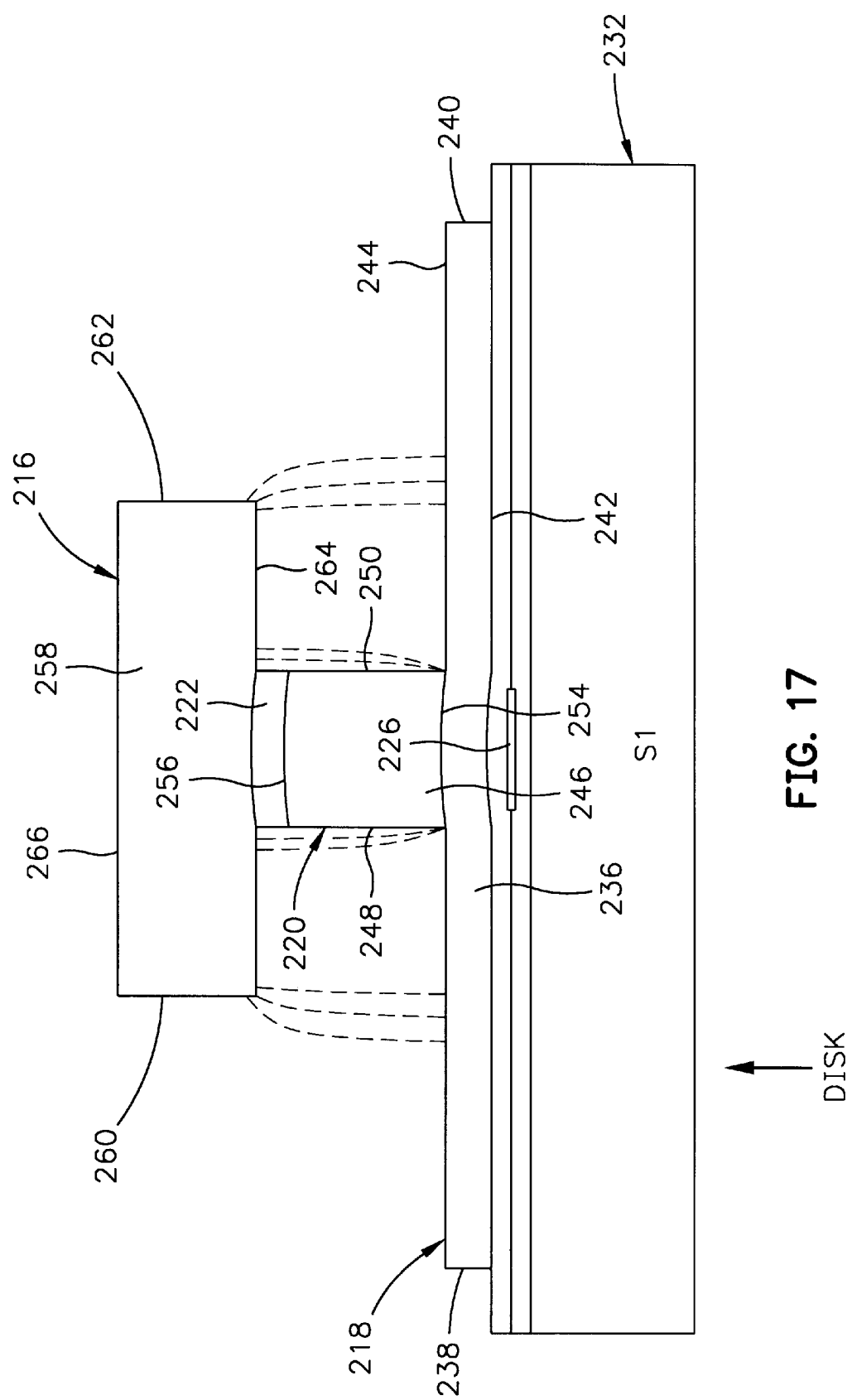
FIG. 17 is an ABS view taken along plane 17—17 of FIG. 16 showing an inverted merged MR head before modification by the present invention.
Figure 18:
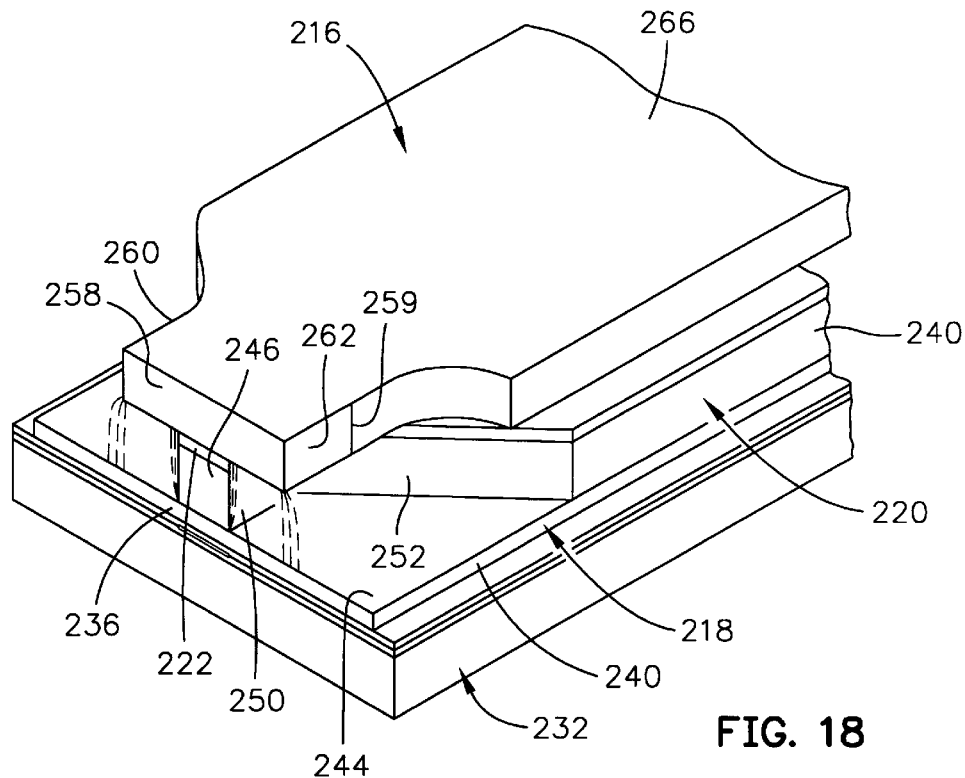
FIG. 18 is an isometric illustration of the inverted merged MR head shown in FIG. 17.

As shown in FIGS. 16–18, the first layer 218 of the first pole piece has a bottom first pole tip 236 which forms a portion of the ABS and has first and second side edges 238 and 240. The layer 218, which is preferably a flat layer, has first and second surfaces 242 and 244 which are partially bounded by the edges 238 and 240. The second layer 220 of the first pole piece is formed directly on the first layer 218 and has a top first pole tip 246 at the ABS that has first and second side edges 248 and 250. The second layer 220 of the first pole piece is preferably a flat layer and has first and second flat surfaces 254 and 256 which are bounded in part by the first and second side edges 248 and 250. The second pole piece layer 216 has a second pole tip 258 and first and second side edges 260 and 262. The second pole piece layer 216 has first and second surfaces 264 and 266, which are partially bounded by the first and second side edges 260 and 262. Because of the profile of the MR sensor 226 there is a slight curvature of the layers 218 and 220 which causes curvature of the write gap 222.

As shown in FIG. 17, the first pole tip 246 is located between the bottom first pole tip 236 and the second pole tip 258. The write gap layer 222 is located between the top first pole tip 246 and the second pole tip 218. Magnetic field signals fringe across this gap layer 222 between the top first pole tip 246 and the second pole tip 258 to write magnetic information signals into a rotating magnetic disk. Because of the width of the second pole tip 258 beyond the side edges 248 and 250 of the top first pole tip, the field signal stream between the pole tips 246 and 258 expands slightly beyond the track width of the top first pole tip 246 causing the written track to be slightly wider than the track width defined by the top first pole tip 246. In order to narrow the track and increase the BPI it would be desirable if this flux stream was more narrowly confined to the track width of the top first pole tip 246. This is accomplished by the present invention described hereinbelow under the title "Improved Inverted Magnetic Write Head". As shown in FIG. 17, the magnetic disk preferably rotates upwardly so that the second pole tip 258 is the last pole tip to pass a written track on the disk. The magnetic head is called an inverted write head because the top first pole tip 246 defines the track width of the head in contrast to the second pole tip 258 defining the track width of the head.

It can be seen from FIGS. 16—18 that the first and second layers 218 and 220 of the first pole piece 214 can be constructed without a reflective notching problem. The first layer 218 of the first pole piece 214 is constructed on the flat gap layers 228 and 230 and will likewise be flat, as shown in FIG. 16. The second layer 220 of the first pole piece is constructed on the first layer 218 and will also be flat. Accordingly, the photoresist used to pattern the layers 218 and 220 will lie flat on the wafer and light will pattern the photoresist layer without any reflective notching. Further, the thickness of the photoresist for patterning is significantly less than the prior art which improves resolution during the light exposure step. Subsequently, the insulation stack, which comprises insulation layers 208, 210 and 212, and one or more coil layers 206 are constructed. When the second pole piece layer 216 is constructed, there may be some reflective notching during the patterning of the second pole piece layer 216. This will be immaterial since the second pole piece layer 216 does not define the track width of the head.

The top first pole tip 246 has the smallest width at the ABS. The second pole tip 258 has a width that is greater than the top first pole tip 246 and the bottom first pole tip 236 has a width that is greater than the second pole tip 258. The large width of the bottom first pole tip 236 is required for shielding the MR sensor 226, and the width of the second pole tip 258 is to ensure that a photoresist patterning step will bridge the top first pole tip 246 in spite of process variations in the photoresist patterning step. It should be noted that the zero throat height (ZTH) of the inverted magnetic head is still located at the separation of the first and second pole pieces 214 and 216 by the insulation stack (insulation layers 208, 210 and 212) and that the flare point will be defined at 259 where the second layer 220 widens as it extends toward the back gap 224.

Figure 19:
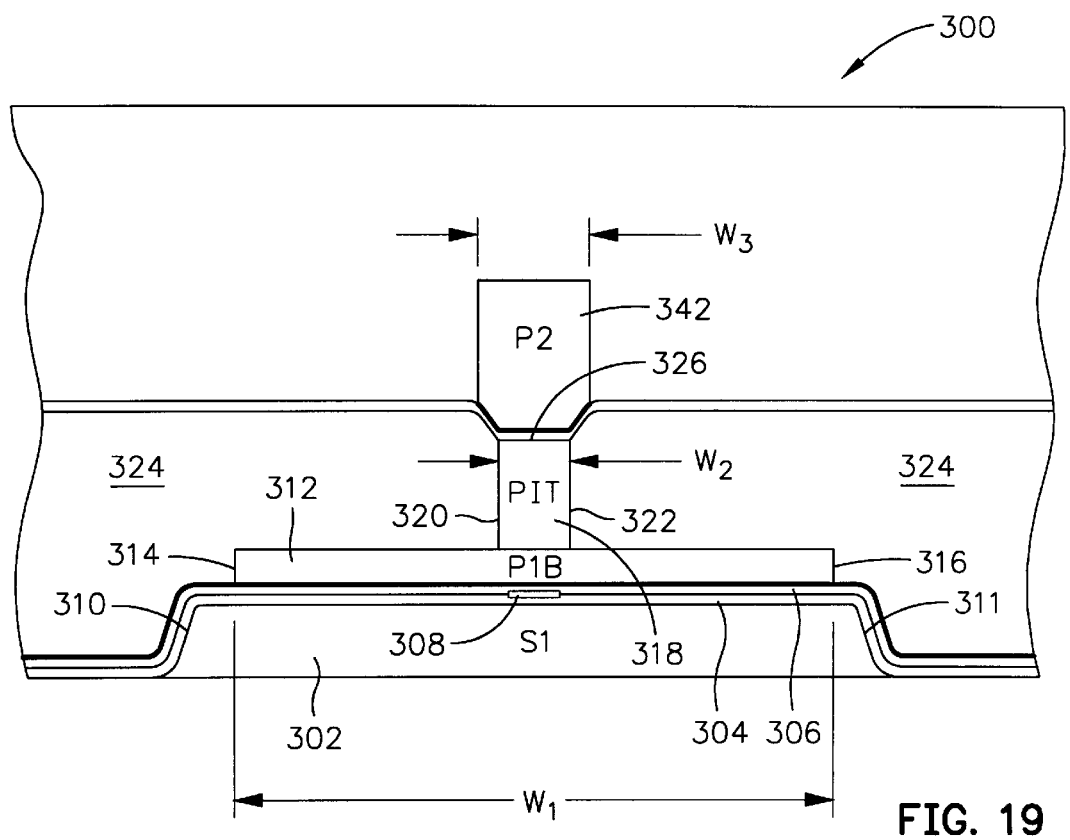
FIG. 19 is a view taken along plane 19—19 of FIG. 16 showing the present inverted merged MR head.
Figure 20:
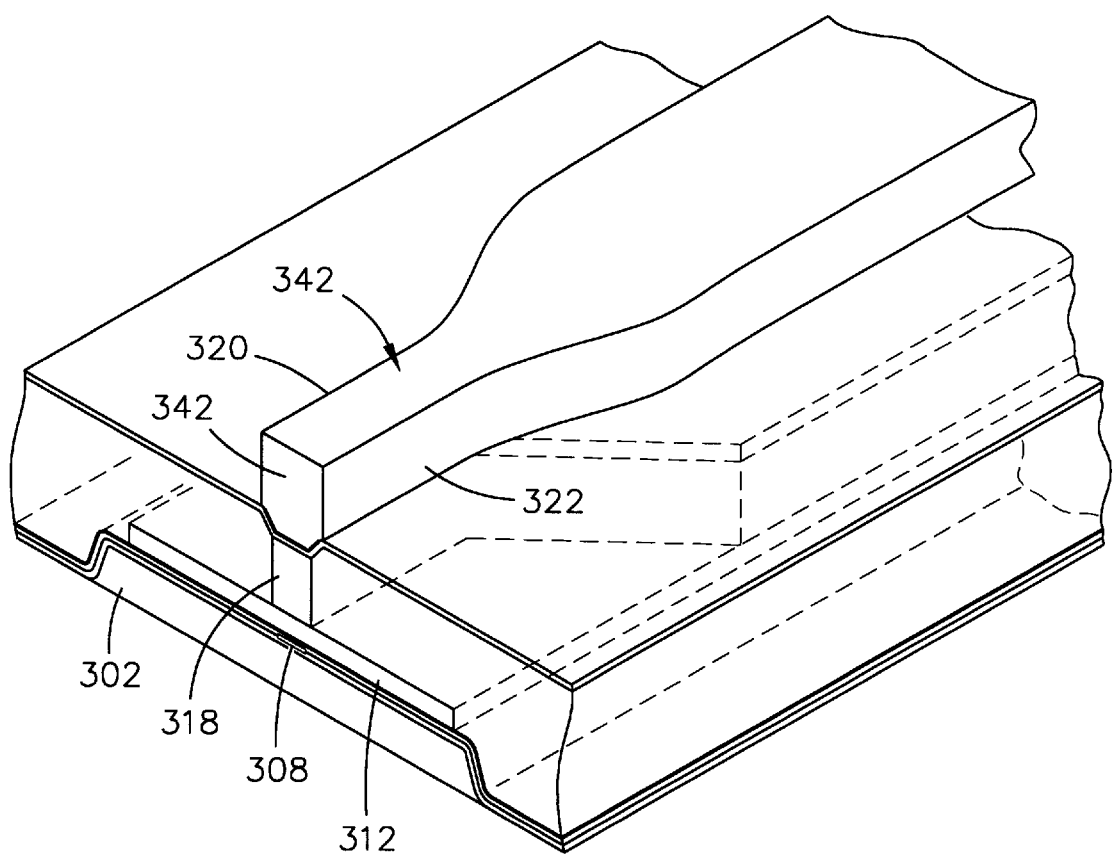
FIG. 20 is an isometric illustration of the present inverted merged MR head.
Figure 21:
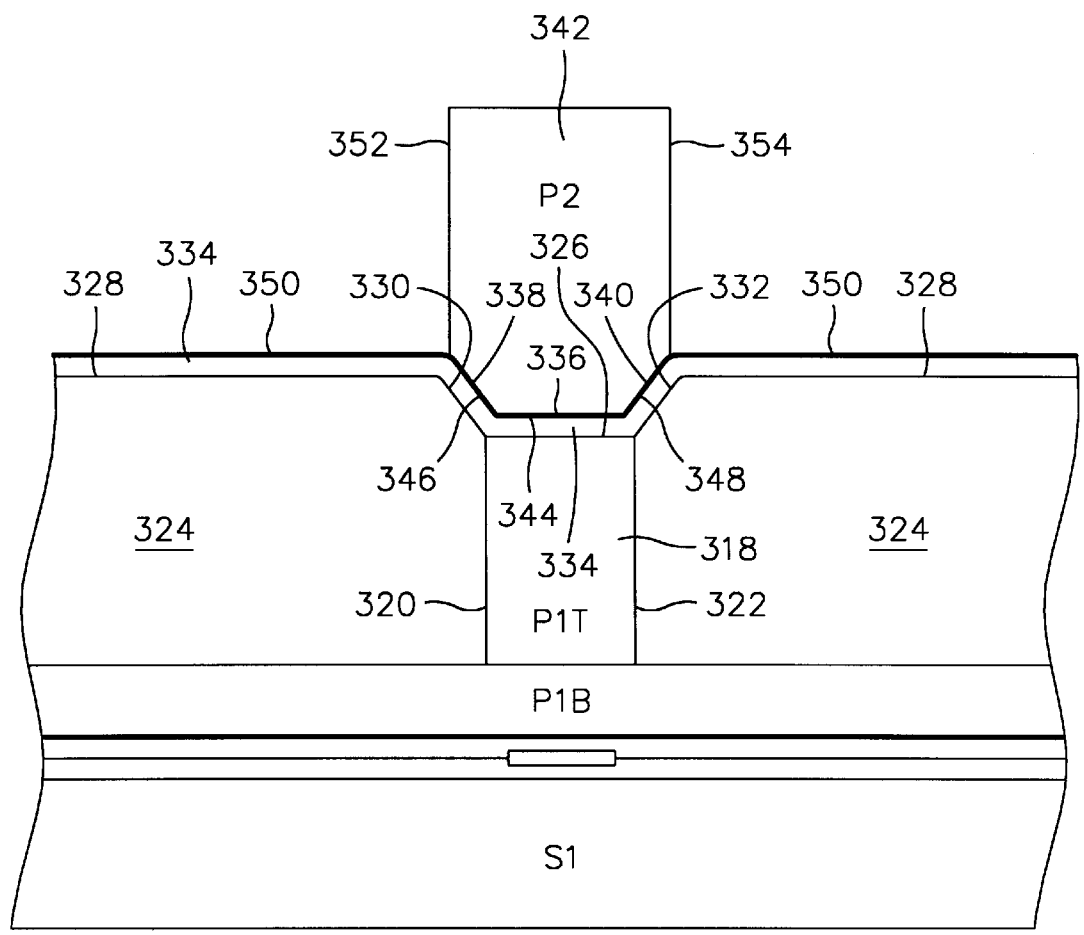
FIG. 21 is an enlarged ABS illustration of FIG. 19 so as to show various details of the present inverted merged MR head.

As shown in FIG. 17, the problem that we found with the present inverted write head is that flux transfer between the top first pole tip 246 and the second pole tip 258 strayed, to some extent, laterally beyond the track width of the top first pole tip 246, thereby widening the written track. This results in less bit per inch (BPI) of the magnetic disk similar to a first pole piece without notching found in the prior art. Further, because of high flux density at the bottom corners of the second pole tip 258 stray flux occurs between the second pole tip 258 and the bottom first pole tip 218. We have overcome these problems by shaping and aligning the second pole tip 258, as shown in FIGS. 19–21. Another problem with the present inverted write head is that the write gap 222 has a curvature like the write gap 102 of the prior art write head shown in FIG. 15. This problem is also overcome by the present invention.

Improved Inverted Merged MR Head

FIGS. 19 and 20 illustrate the present improved inverted merged MR head 300. The head includes a first shield layer 302, first and second gap layers 304 and 306 and an MR sensor 308 which may be an anisotropic magnetoresistive (AMR) sensor or a spin valve sensor 308. The MR sensor 308 is located between the first and second gap layers 304 and 306 and the first and second gap layers 304 and 306 are formed on the first shield layer 302. The first shield layer 302 may have first and second side walls 310 and 311. A bottom first pole tip 312 is on the second gap layer 306 and has first and second side walls 314 and 316. A top first pole tip layer 318 is on the bottom first pole tip layer 312 and has a width W2 between first and second side walls 320 and 322 which define the track width of the merged MR head 300.

A non-magnetic, non-conductive second pole tip forming layer 324 covers the layers 302, 304, 306 and 312 to a level slightly higher than a top surface 326 of the top first pole tip layer 318. As shown in FIG. 21, the top surface 326 of the top first pole tip 318 is slightly below a top surface 328 of the second pole tip forming layer 324. The forming layer 324 has first and second tapered surfaces 330 and 332 which interconnect the top surface 326 of the top first pole tip 318 with first and second portions of the top surface 328 of the forming layer 324. This causes the top surface 326 and the tapered surfaces 330 and 332 to form a recess which is directly above the top surface 326 and is aligned therewith. This recess is formed by a unique method of making which is described hereinbelow.

A write gap layer 334 fills the recess and substantially replicates the aforementioned recess as defined by a recessed surface 336 and first and second tapered edges 338 and 340. Located within the recess of the gap layer is a second pole tip layer 342 that has a bottom surface 344 and first and second tapered edges 346 and 348 which slope upwardly therefrom to the level of a top surface 350 of the write gap layer 334. In a preferred embodiment the tapered edges 346 and 348 are contiguous with first and second vertical side walls 352 and 354 of the second pole tip layer. This will minimize any side writing of tracks because of potential flux leakage between the vertical corners shown along 352 and 354 to the bottom first pole tip layer 312. With the improved inverted merged MR head 300, shown in FIGS. 19, 20 and 21, the field signal transfer between the top first pole tip 318 and the second pole tip 342 will be more narrowly confined to the width $W_2$ of the top first pole tip 318, as compared to the field signal transfer between the top first pole tip 246 and the second pole tip 256 of the inverted merged MR head shown in FIGS. 17 and 18.

As shown in FIG. 19, the bottom first pole tip layer 312 has a lateral width $W_1$, the top first pole tip layer 318 has a width $W_2$ and the second pole tip layer 342 has a width $W_3$. The width $W_3$ is greater than the track width $W_2$ and the width $W_1$ is greater than $W_3$. The width $W_3$ is preferably in the range of 1.0 to 3.0 μm greater than $W_2$. With this narrow width the second pole tip layer 342 will not leak flux from its vertical corners 352 and 354 to the considerably wider bottom first pole tip layer 312, thereby obviating the problem exemplified by the inverted merged MR head shown in FIG. 17.

Figure 32:
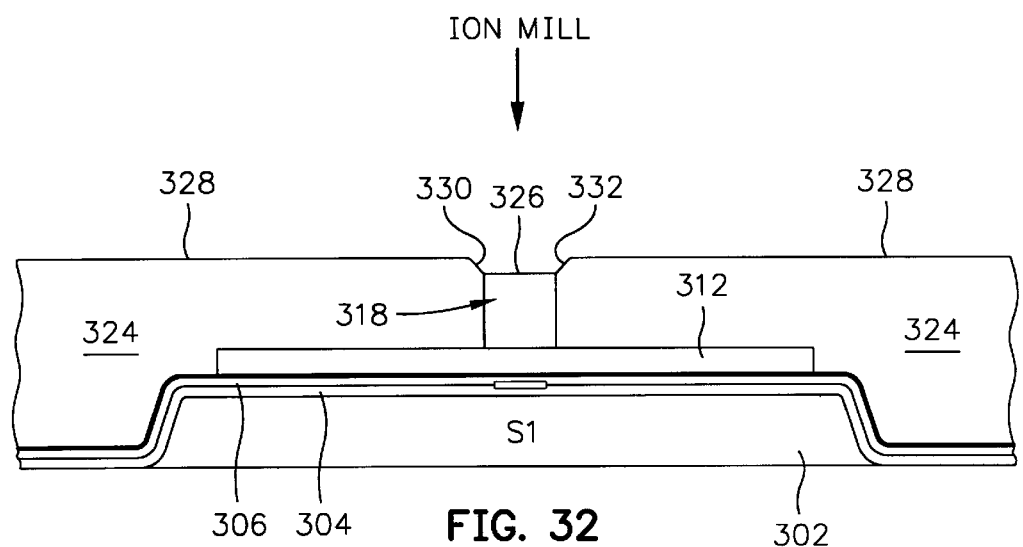
FIG. 32 is the same as FIG. 31 except ion milling is implemented to mill the top of the top first pole tip to form a recess defined by the top of the first pole tip and tapered edges of the second pole tip forming layer.

In the preferred embodiment the thickness of the bottom first pole tip layer 312 is 0.5 to 1.5 μm. It should be noted that, by keeping this layer relatively thin, this further prevents any flux transfer between the vertical corners 352 and 354 of the second pole tip layer 342 to the bottom first pole tip layer 312. The thickness of the top first pole tip layer 318 is preferably 2 to 5 μm. The recess formed by the surfaces 326, 330 and 332 in FIG. 32 is preferably 250 to 500 nanometers (nm). The write gap layer 334 is preferably 0.1 to 0.5 μm thick. The thickness of the top first pole tip layer 318 is preferably 2 to 4 μm thick.

The method of making the improved inverted merged MR head 300, shown in FIGS. 19–21, is shown in a series of process steps in FIGS. 22–39. The various layers of the method of making are formed by sputter deposition or plating. Generally, the metallic layers are formed by plating and the non-conductive layers are formed by sputter deposition. Sputter deposition is implemented in a vacuum chamber wherein a target of desired material is sputtered to a substrate via a plasma in the chamber because of an applied potential between the target and the substrate. Plating is a wet process wherein the wafer is placed in an electrolyte and a potential is applied between the surface to be plated and a plating material. Metallic ions from the plating material are then deposited on the desired surface. Masking is accomplished by photoresist masks which are spun onto the wafer imaged with light for the portions to be removed and then the portions to be removed are removed by a developer. After the desired layer is deposited the photoresist mask is then stripped by a dissolvent. Layer portions are removed by ion milling which, in essence, is particle bombardment of the layer with ions. It should be understood that these process steps are exemplary and there may be other steps well known in the art for forming the layers. FIGS. 22–33 and 35–39 are referred to as ABS views, however, these views are, in essence, views of ABS sites, since the ABS is not formed until after the magnetic heads are cut into rows.

Figure 22:
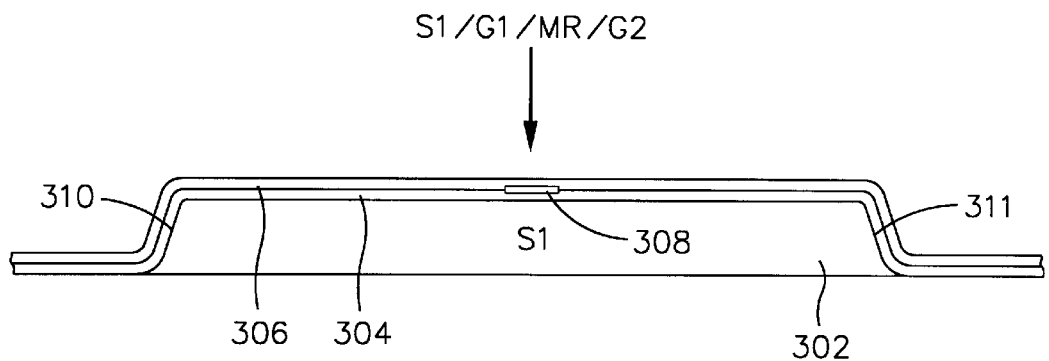
FIG. 22 is an ABS illustration of first steps in the present method of making the present inverted merged MR head which include formation of a first shield layer, first and second gap layers and an MR sensor located therebetween.

In FIG. 22 the first shield layer 302, the first gap layer 304, the MR sensor 308 and the second gap layer 306 are formed on a wafer substrate (not shown) With the first shield layer having first and second side surfaces 310 and 311. The wafer substrate (not shown) may have a plurality of magnetic head sites arranged in rows and columns.

Figure 23:
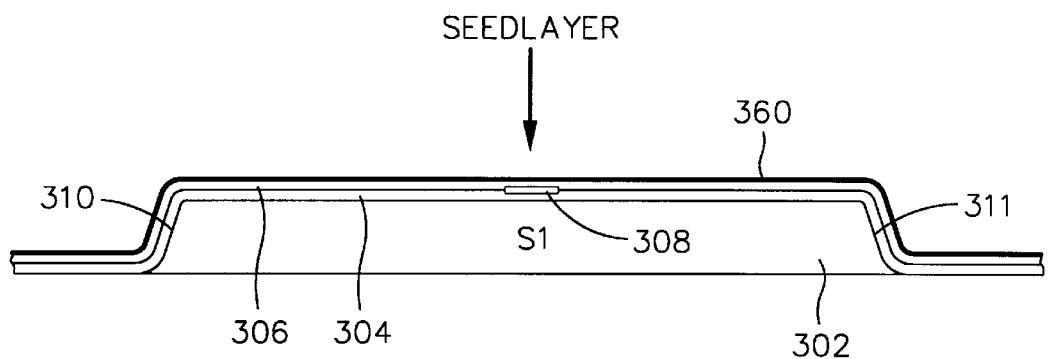
FIG. 23 is the same as FIG. 22 except a seedlayer has been deposited.
Figure 24:
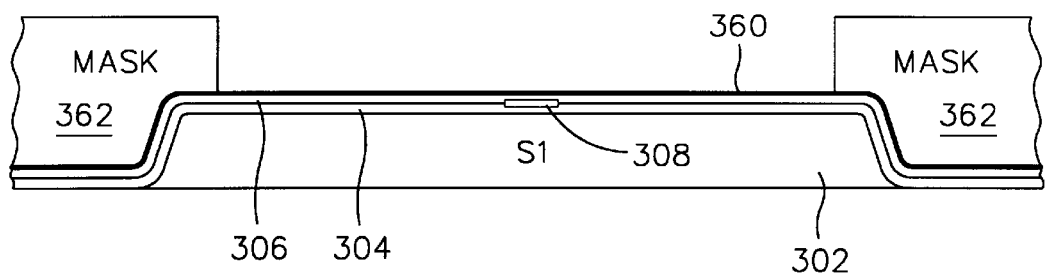
FIG. 24 is the same as FIG. 23 except a photoresist mask has been formed for depositing a top first pole tip layer.
Figure 25:
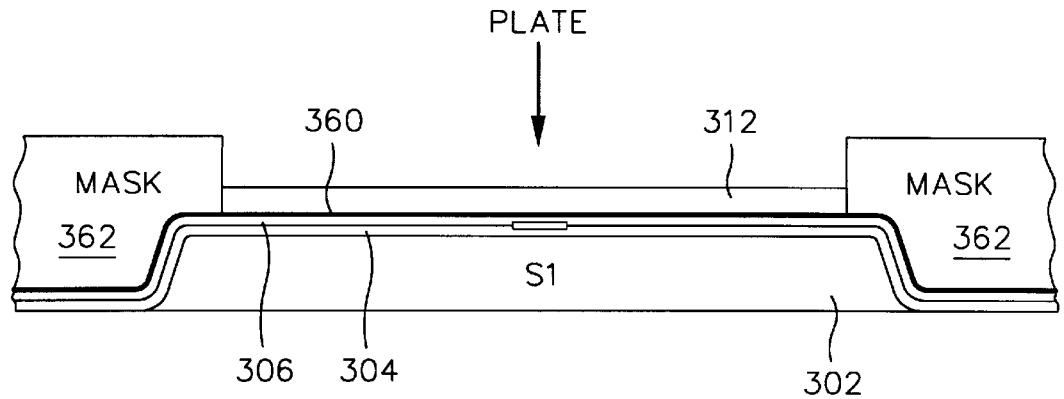
FIG. 25 is the same as FIG. 24 except the top first pole tip layer has been formed by plating.
Figure 26:
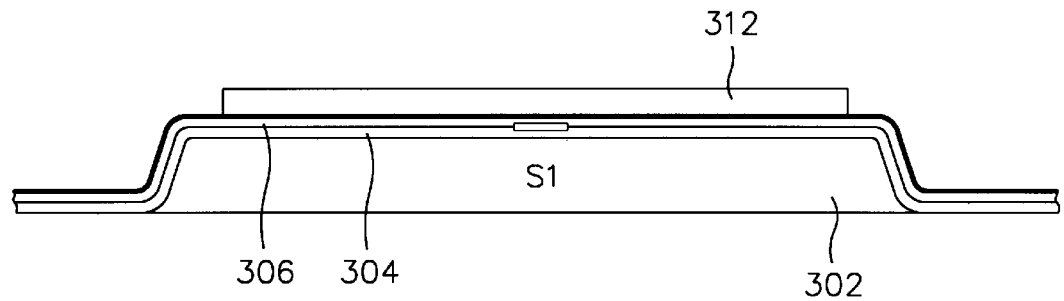
FIG. 26 is the same as FIG. 25 except the photoresist mask has been removed.
Figure 27:
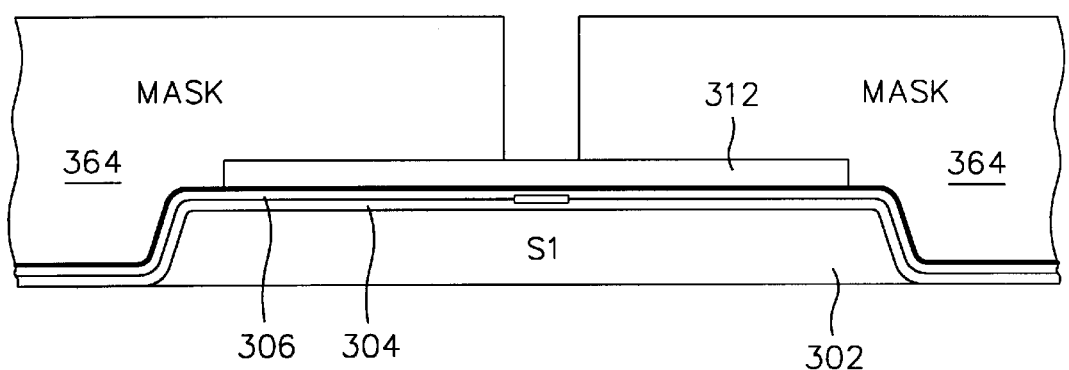
FIG. 27 is the same as FIG. 26 except a second photoresist mask has been formed for forming a top first pole tip layer.

FIG. 23 is the same as FIG. 22 except a seedlayer, shown by the heavy line 360, has been deposited by sputtering on the second gap layer 306. A seedlayer is necessary for the deposition of the next metallic layer which is described hereinbelow. FIG. 24 is the same as FIG. 23 except a photoresist mask 362 has been formed with an opening for the plating of the next metallic layer. FIG. 25 is the same as FIG. 24 except the bottom first pole tip layer 312 has been plated on the seedlayer 360. FIG. 26 is the same as FIG. 25 except the mask 362 has been removed.

Figure 28:
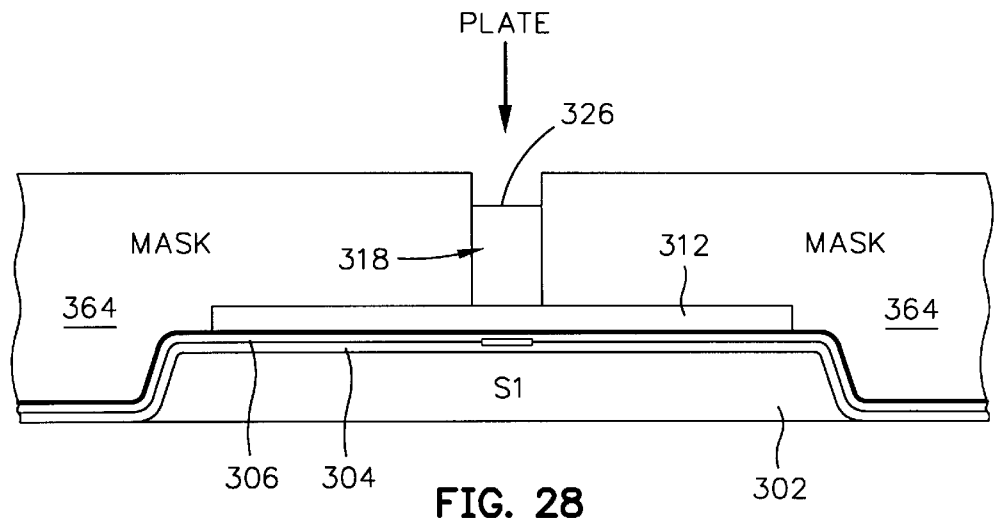
FIG. 28 is the same as FIG. 27 except the top first pole tip layer has been formed by plating.
Figure 29:
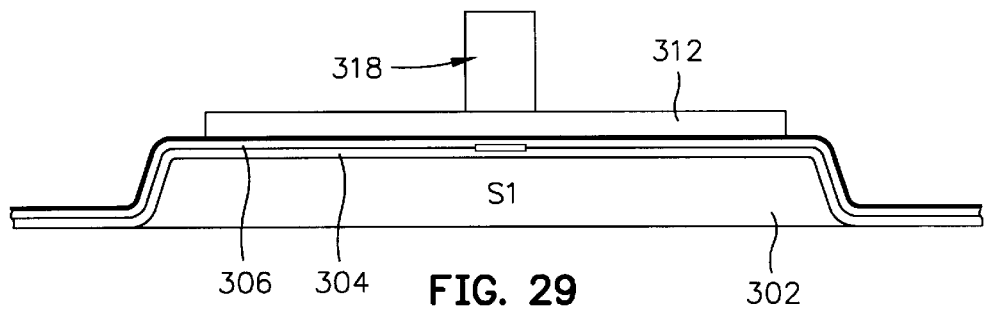
FIG. 29 is the same as FIG. 28 except the photoresist mask has been removed.

A second photoresist mask 364 is then formed on the layers with an opening for plating the next metallic element. FIG. 28 is the same as FIG. 27 except the top first pole piece layer 318 has been plated. In FIG. 29 the second photoresist mask 364 has been removed.

Figure 30:
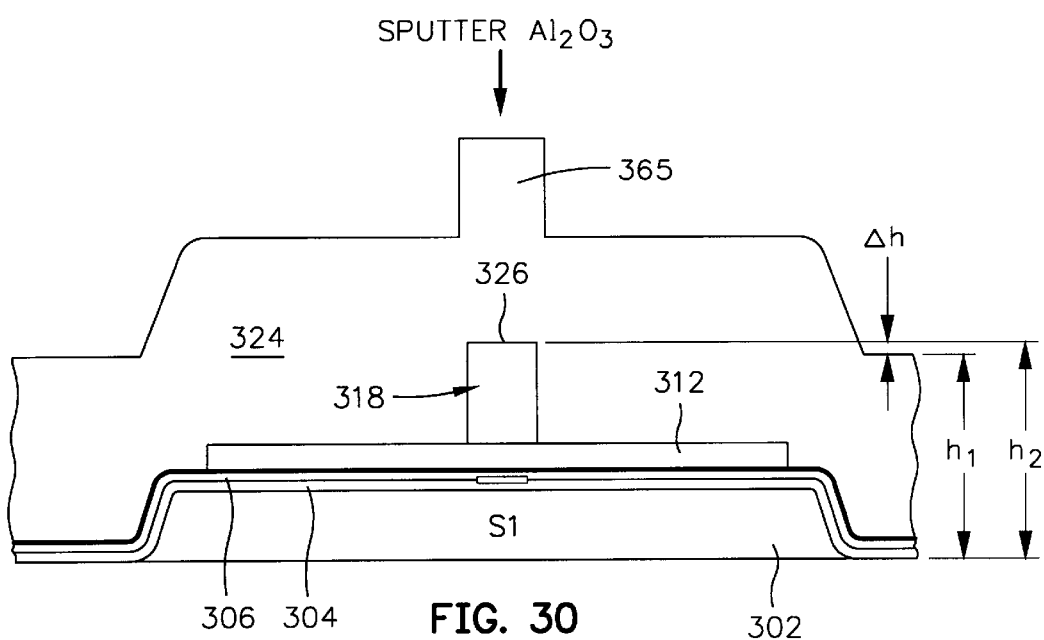
FIG. 30 is the same as FIG. 29 except a second pole tip forming layer has been deposited on top of all of the layers.

In FIG. 30 a second pole tip forming layer 324 has been formed on all of the layers. This layer will have a higher profile over the layers because of replication. Accordingly, directly above the top first pole tip layer 318 there is high profile 365 of the second pole tip forming layer 324. Further, above the first shield layer 302 and the layers thereon there is a higher profile because of replication. The actual height of the forming layer 324 in the field, beyond the layers, is $h_1$ from the bottom of the first shield layer 302 and the height of the top 326 of the top first pole piece layer 318 is $h_2$. In the preferred embodiment the height $h_1$ of the forming layer 324 is slightly lower than the height $h_2$ of the top first pole tip layer 318 by a distance $\Delta h$. This preferred distance is 0.25 to 1.0 $\mu$m.

Figure 31:
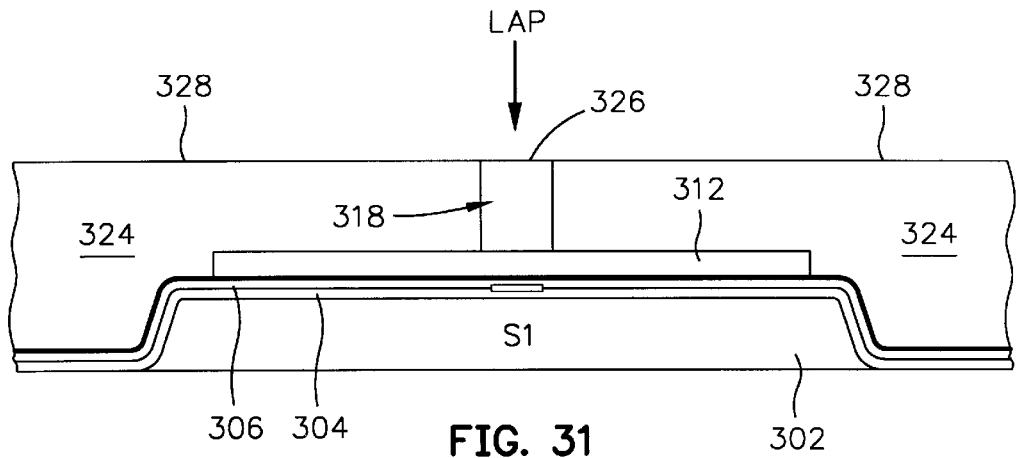
FIG. 31 is the same as FIG. 30 except the second pole tip forming layer and the top of the top first pole tip has been lapped so that all surfaces are flush with one another.

In FIG. 31 the top surfaces of the forming layer 324 and the top first pole tip layer 318 are lapped so that they are flush with one another, as shown by top surfaces 326 and 328. It should be noted that the top surfaces 326 and 328 have both been lapped until they are at the level of $h_1$ or therebelow in FIG. 30. Accordingly, a small top portion of the top first pole tip layer 318 may have been lapped away so as to provide the flush arrangement shown in FIG. 31. It should also be noted that the lapping step has eliminated any write gap curvature of the write gap 334 above the top first pole tip layer 318, which is a problem with the write gap layers 102 (FIG. 15) and 222 (FIG. 17).

It is important that the material for each of the top first pole tip layer 318 and the second pole tip defining layer 324 be selected so that the top first pole tip layer 318 can be ion milled at a faster rate than the forming layer 324. The preferred materials are nickel iron (NiFe) for the top first pole tip layer 318 and alumina ($Al_2O_3$) for the forming layer 324. The nickel iron for the top first pole tip layer 318 may be $Ni_{80}Fe_{20}$, which is highly permeable, or $Ni_{45}Fe_{55}$, which is a high magnetic moment material. The high magnetic moment material is preferred so that the top first pole tip 318 will be able to carry more flux.

In FIG. 32 the top surfaces of the forming layer 324 and the top first pole piece layer 318 are milled by ion milling. Since the top first pole tip layer 318 is milled faster than the forming layer 324, the top surface 326 will be recessed below the top surface 328 of the second pole tip forming layer 324. Ion milling also causes the second pole tip forming layer 324 to have first and second tapered edges 330 and 332 which extend from the top surface 326 of the top first pole tip layer 318 to the first and second portions of the top surface 328 of the forming layer 324. The top surface 326 of the top first pole tip layer 318 and the tapered surface 330 and 332 of the forming layer 324 provide a recess which serves an important function for the present invention, which will be explained hereinafter.

Figure 33:
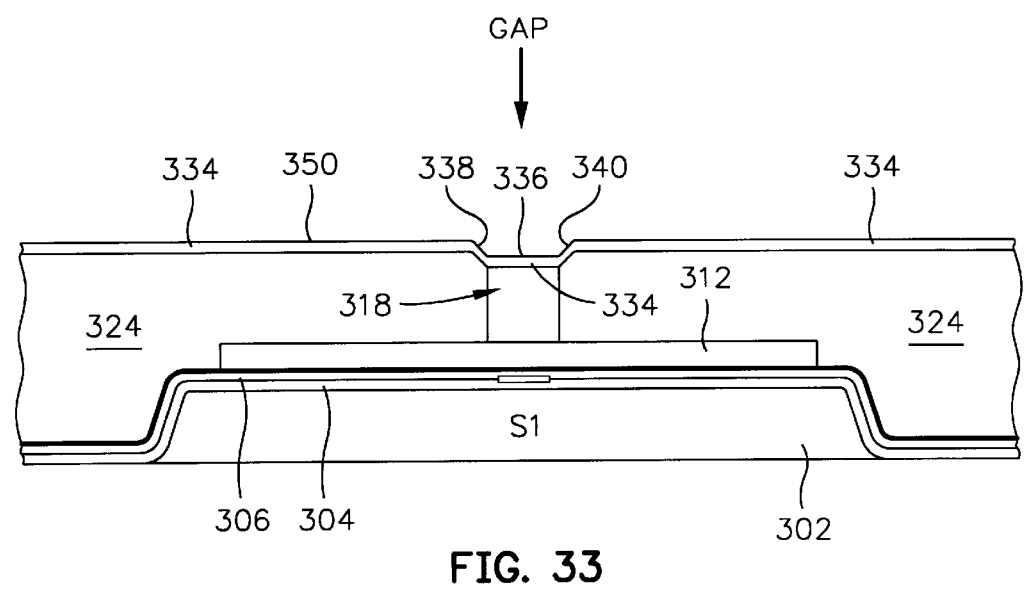
FIG. 33 is the same as FIG. 32 except a write gap layer has been formed in the recess.

In FIG. 33 the gap layer 334 has been deposited within the recess so that the gap layer has a recessed surface 336 and first and second tapered surfaces 338 and 340 which form a recess in the gap layer. The gap layer is preferably 0.1 to 0.5 $\mu$m in thickness. As shown in FIG. 34, the first insulation layer I1, the coil layer second insulation layer I2 and the third insulation layer I3, which are shown as layers 208. 206, 210 and 212 in FIG. 16, may then be formed.

Figure 37:
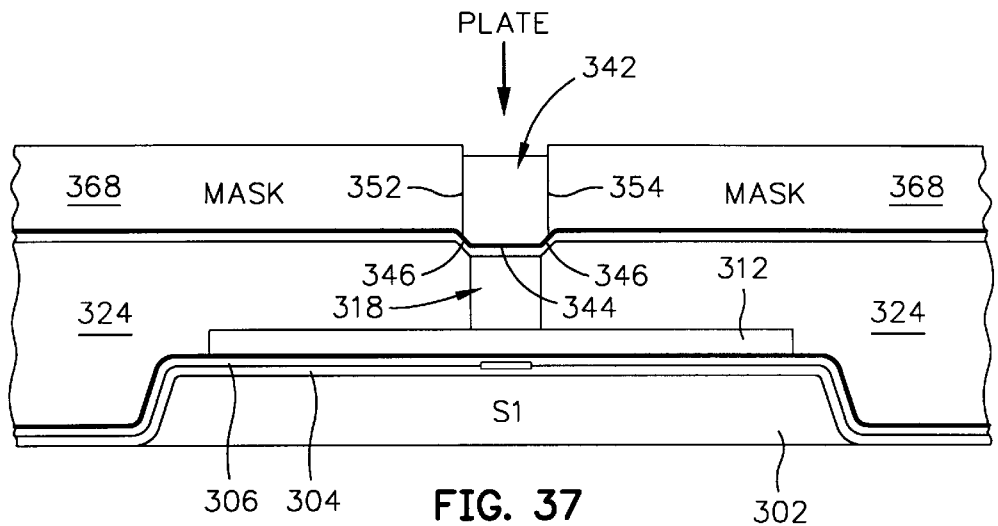
FIG. 37 is the same as FIG. 36 except the second pole tip layer has been formed by plating.
Figure 38:
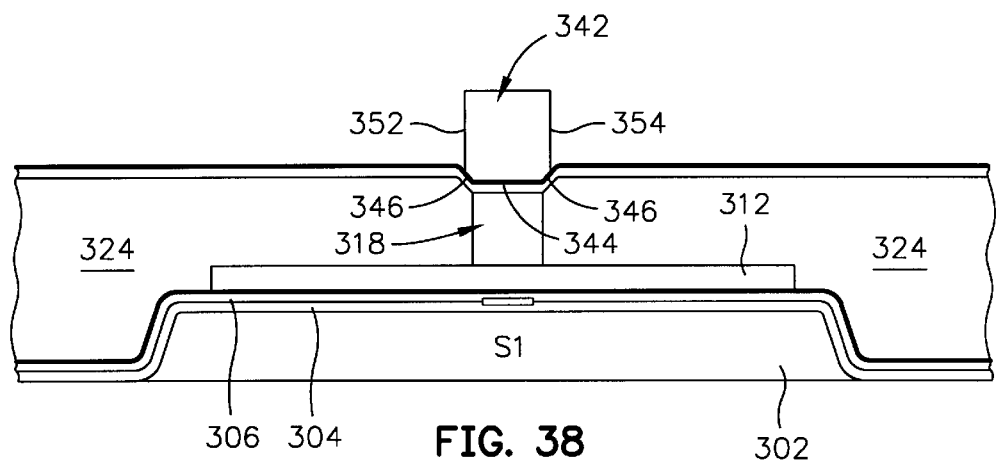
FIG. 38 is the same as FIG. 37 except the photoresist mask has been removed.
Figure 39:
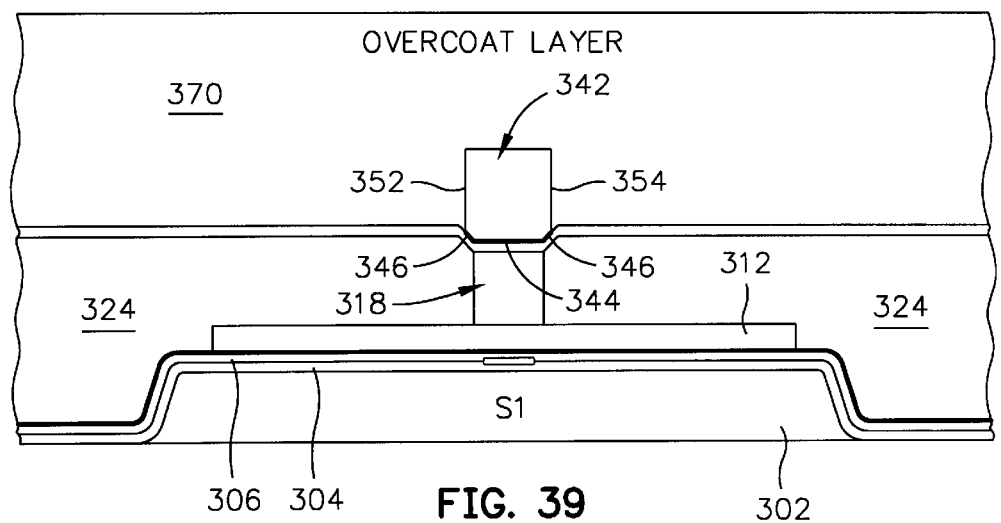
FIG. 39 is the same as FIG. 38 except an overcoat layer has been formed on all of the layers.

In FIG. 35 a seedlayer, which is shown by the heavy line 366, is formed on top of the gap layer 334. In FIG. 36 a third photoresist mask 368 is formed on the seedlayer with an opening where the next metallic layer is to be formed. In FIG. 37 the second pole tip layer 342 is formed in the recess provided by the gap layer 334. This provides the second pole tip layer 342 with a bottom surface 344 and first and second tapered surfaces 346 and 348 which preferably are contiguous with first and second vertical side walls 352 and 354. In FIG. 38 the photoresist mask 368 has been removed. It should be noted that the method of making has self-aligned the second pole tip layer 342 with the top first pole tip layer 318. Flux transfer between the pole tips 318 and 342 will be more nearly confined to the track width defined by the top first pole tip layer 318. In FIG. 39 an overcoat layer 370 has been formed covering all of the layers.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A method of making a magnetic write head that has an air bearing surface (ABS) comprising the steps of:

forming a first pole piece with a first component wherein the first component has a first surface and first and second edges that define a width W1 at the ABS;

forming the first pole piece with a second component on a portion of the first surface of the first component wherein the second component has a first surface and first and second edges that define a track width W2 of the head at the ABS;

forming a forming layer on another portion of the first surface of the first component, adjacent the first and second edges of the second component, wherein the forming layer has a first surface;

forming the first surface of the second component and portions of the first surface of the forming layer into a first recess with the first surface of the second component forming a bottom surface of the first recess;

forming a write gap layer in said first recess wherein the write gap has a second recess; and forming said second pole piece component in the second recess of the write gap layer with first and second edges that define a width W3 at the ABS.

2. A method as claimed in claim 1 including:

the second component having an ion milling rate greater than an ion milling rate of the forming layer; and forming the first recess by ion milling.

3. A method as claimed in claim 1 including:

forming the bottom surface of the first recess with a width W4 at the ABS that is substantially equal to the width W2; and forming the second recess with a bottom surface that has substantially said width W4.

4. A method as claimed in claim 1 including:
forming the first recess with first and second sloping side surfaces that slope upwardly from the bottom surface of the first recess at an angle less than 90° with respect to said bottom surface.

5. A method as claimed in claim 1 wherein the first recess has a depth of 250–500 nm.

6. A method as claimed in claim 1 wherein W1 is greater than W3 and W3 is greater than W2.

7. A method as claimed in claim 6 wherein the W3 is 1–3 μm greater than the width W2.

8. A method as claimed in claim 1 wherein the forming layer is $Al_2O_3$ and the second component comprises NiFe.

9. A method as claimed in claim 1 wherein before forming the second pole piece component the method includes the steps of:
forming the first pole piece with a third component that is connected to the first and second components and extends from the first and second components away from the ABS;
forming a first insulation layer of an insulation stack on the third component;
forming at least one coil layer on the first insulation layer; and
forming at least a second insulation layer of an insulation stack on said at least one coil layer.

10. A method as claimed in claim 1 wherein the first component has a thickness of 0.5 to 1.5 μm and the second component has a thickness of the 2–5 μm.

11. A method as claimed in claim 1 wherein the second component is constructed of a higher magnetic moment material than a magnetic moment material of each of the first component and the second pole piece component.

12. A method as claimed in claim 11 wherein the first component and the second pole piece component are substantially $Ni_{80}Fe_{20}$ and the second component is substantially $Ni_{45}Fe_{55}$.

13. A method as claimed in claim 1 wherein the write gap layer has a thickness of 0.1 to 0.5 μm.

14. A method as claimed in claim 1 including:
before forming said first recess lapping the first surfaces of the forming layer and the second component until the first surfaces are substantially flat.

15. A method as claimed in claim 14 including:
the second component having an ion milling rate greater than an ion milling rate of the forming layer; and
forming the first recess by ion milling.

16. A method as claimed in claim 15 including:
forming the bottom surface of the first recess with a width W4 at the ABS that is substantially equal to the width W2; and
forming the second recess with a bottom surface that has substantially said width W4.

17. A method as claimed in claim 16 including:
forming the first recess with first and second sloping side surfaces that slope upwardly from the bottom surface of the fist recess at an angle less than 90° with respect to said bottom surface.

18. A method as claimed in claim 17 wherein the first recess has a depth of 250–500 nm.

19. A method as claimed in claim 18 wherein W1 is greater than W3 and W3 is greater than W2.

20. A method as claimed in claim 19 wherein the W3 is 1–3 μm greater than the width W2.

21. A method as claimed in claim 20 wherein the forming layer is $Al_2O_3$ and the second component comprises NiFe.

22. A method as claimed in claim 21 wherein before forming the second pole piece component the method includes the steps of:
forming the first pole piece with a third component that is connected to the first and second components and extends from the first and second components away from the ABS;
forming a first insulation layer of an insulation stack on the third component;
forming at least one coil layer on the first insulation layer; and
forming at least a second insulation layer of an insulation stack on said at least one coil layer.

23. A method as claimed in claim 22 wherein the first component has a thickness of 0.5 to 1.5 μm and the second component has a thickness of the 2–5 μm.

24. A method as claimed in claim 23 wherein the second component is constructed of a higher magnetic moment material than a magnetic moment material of each of the first component and the second pole piece component.

25. A method as claimed in claim 24 wherein the first component and the second pole piece component are substantially $Ni_{80}Fe_{20}$ and the second component is substantially $Ni_{45}Fe_{55}$.

26. A method as claimed in claim 25 wherein the write gap layer has a thickness of 0.1 to 0.5 μm.

27. A method of making an inverted magnetic write head that has an air bearing surface comprising the steps of:
forming a first pole piece with a first ferromagnetic layer that has a bottom first pole tip with first and second edges that define a width W1 at the ABS;
forming the first pole piece with a second ferromagnetic layer that has a top first pole tip located on the bottom first pole tip with a top surface partially bounded by first and second side edges that define a width W2 at the ABS;
the width W2 being less than the width W1 and defining a track width of the write head;
forming a non-magnetic, non-conductive second pole piece forming layer on the bottom and top first pole tips;
lapping the forming layer and the top first pole tip until the forming layer and the top first pole tip have top flush surfaces with respect to one another;
forming a recess by milling the top surfaces of the top first pole tip and the forming layer until the top surface of the top first pole tip is recessed below the top surface of the forming layer and the forming layer has first and second inclined edges that slope upwardly from the top surface of the top first pole tip at an angle less than 90° to the top surface of the top first pole tip;
forming a non-magnetic write gap layer on the top surface of the top first pole tip and on the inclined edges of the forming layer so that the write gap layer has a recess that substantially replicates said recess formed by the top surface of the top first pole tip and the inclined edges of the forming layer; and
forming a second pole piece with a ferromagnetic layer that has a second pole tip in the recess of the write gap layer so that the second pole tip has a bottom surface that substantially matches and is aligned with the top surface of the top first pole tip and has first and second inclined bottom edges that slope from the bottom surface of the second pole tip at said angle less than 90°.

28. A method as claimed in claim 27 wherein the second pole tip has vertical side edges that define a width W3 at the ABS that is 1–3 µm greater than the width W1 of the top first pole tip.

29. A method as claimed in claim 27 wherein the forming layer is $Al_2O_3$ and the top first pole tip comprises NiFe.

30. A method as claimed in claim 27 wherein, after forming and before lapping the forming layer, the forming layer has a top surface in a field laterally beyond the bottom first pole tip that is below the top surface of the top first pole tip.

31. A method as claimed in claim 27 wherein a thickness of the bottom first pole tip is 0.5 to 1.5 µm and a thickness of the bottom first pole tip is 2–5 µm.

32. A method as claimed in claim 27 wherein the write gap layer has a thickness of 0.1 to 0.5 µm.

33. A method as claimed in claim 27 wherein the top first pole tip is constructed of a higher magnetic moment material than a magnetic moment material of each of the bottom first pole tip and the second pole tip.

34. A method as claimed in claim 33 wherein the bottom first pole tip and the top first pole tip are $Ni_{80}Fe_{20}$ and the second pole tip is $Ni_{45}Fe_{55}$.

35. A method as claimed in claim 27 wherein after forming the gap layer but before forming the second pole piece, the method includes the steps of:

forming a first insulation layer of an insulation stack on the second ferromagnetic layer;

forming at least one coil layer on the first insulation layer; and forming at least a second insulation layer of the insulation stack on said at least one coil layer.

36. A method as claimed in claim 27 wherein said recess has a depth of 250–500 nm.

37. A method as claimed in claim 36 wherein the second pole tip has vertical side edges that define a width W3 at the ABS that is 1–3 µm greater than the width W1 of the top first pole tip.

38. A method as claimed in claim 37 wherein the forming layer is $Al_2O_3$ and the top first pole tip comprises NiFe.

39. A method as claimed in claim 38 wherein, after forming and before lapping the forming layer, the forming layer has a top surface in a field laterally beyond the bottom first pole tip that is below the top surface of the top first pole tip.

40. A method as claimed in claim 39 wherein a thickness of the bottom first pole tip is 0.5 to 1.5 µm and a thickness of the bottom first pole tip is 2–5 µm.

41. A method as claimed in claim 40 wherein the write gap layer has a thickness of 0.1 to 0.5 µm.

42. A method as claimed in claim 41 wherein the top first pole tip is constructed of a higher magnetic moment material than a magnetic moment material of each of the bottom first pole tip and the second pole tip.

43. A method as claimed in claim 42 wherein the bottom first pole tip and the top first pole tip are $Ni_{80}Fe_{20}$ and the second pole tip is $Ni_{45}Fe_{55}$.

44. A method as claimed in claim 43 wherein, after forming the gap layer but before forming the second pole piece, the method includes the steps of:

forming a first insulation layer of an insulation stack on the second ferromagnetic layer;

forming at least one coil layer on the first insulation layer; and forming at least a second insulation layer of the insulation stack on said at least one coil layer.

45. A method of making a combined magnetic write and read head comprising the steps of:

forming a ferromagnetic first shield layer;

forming a non-magnetic first gap layer on the first shield layer;

forming a sensor layer and first and second lead layers on the first gap layer with the first and second lead layers connected to the sensor layer;

forming a non-magnetic second gap layer on the sensor layer and the first and second lead layers;

forming a first pole piece on the second gap layer with a first component that has a first surface and first and second edges that define a width W1 at the ABS;

forming the first pole piece with a second component on a portion of the first surface of the first component wherein the second component has a first surface and first and second edges that define a track width W2 of the head at the ABS;

forming a forming layer on another portion of the first surface of the first component, adjacent the first and second edges of the second component, and wherein the forming layer has a first surface;

forming the first surface of the second component and portions of the first surface of the forming layer into a first recess with the first surface of the second component forming a bottom surface of the first recess;

forming a write gap layer in said first recess with a second recess;

forming said second pole piece component in the second recess of the write gap layer with first and second edges that define a width W3 at the ABS.

46. A method as claimed in claim 45 including:

before forming said first recess lapping the first surfaces of the forming layer and the second component until the first surfaces are substantially flat.

47. A method as claimed in claim 46 including:

the second component having an ion milling rate greater than an ion milling rate of the forming layer; and forming the first recess by ion milling.

48. A method as claimed in claim 47 including:

forming the bottom surface of the first recess with a width W4 at the ABS that is substantially equal to the width W2; and forming the second recess with a bottom surface that has substantially said width W4.

49. A method as claimed in claim 48 including:

forming the first recess with first and second sloping side surfaces that slope upwardly from the bottom surface of the fist recess at an angle less than 90° with respect to said bottom surface.

50. A method as claimed in claim 49 wherein the first recess has a depth of 250–500 nm.

51. A method as claimed in claim 50 wherein W1 is greater than W3 and W3 is greater than W2.

52. A method as claimed in claim 51 wherein the W3 is 1–3 µm greater than the width W2.

53. A method as claimed in claim 52 wherein the forming layer is $Al_2O_3$ and the second component comprises NiFe.

54. A method as claimed in claim 53 wherein before forming the second pole piece component the method includes the steps of:

forming the first pole piece with a third component that is connected to the first and second components and extends from the first and second components away from the ABS;

forming a first insulation layer of an insulation stack on the third component;

forming at least one coil layer on the first insulation layer; and forming at least a second insulation layer of an insulation stack on said at least one coil layer.

55. A method of making a combined magnetic write and read head comprising the steps of:

forming a ferromagnetic first shield layer;

forming a non-magnetic first read gap layer on the first shield layer;

forming a sensor layer and first and second lead layers on the first read gap layer with the first and second lead layers connected to the sensor layer;

forming a non-magnetic second read gap layer on the sensor layer and the first and second lead layers;

forming a first pole piece with a first ferromagnetic layer that has a bottom first pole tip with first and second edges that define a width W1 at the ABS;

forming the first pole piece with a second ferromagnetic layer that has a top first pole tip located on the bottom first pole tip with a top surface partially bounded by first and second side edges that define a width W2 at the ABS;

the width W2 being less than the width W1 and defining a track width of the write head;

forming a non-magnetic, non-conductive second pole piece forming layer on the bottom and top first pole tips;

lapping the forming layer and the top first pole tip until the forming layer and the top first pole tip have top flush surfaces with respect to one another;

forming a recess by milling the top surfaces of the top first pole tip and the forming layer until the top surface of the top first pole tip is recessed below the top surface of the forming layer and the forming layer has first and second inclined edges that slope upwardly from the top surface of the top first pole tip at an angle less than 90° to the top surface of the top first pole tip;

forming a non-magnetic write gap layer on the top surface of the top first pole tip and on the inclined edges of the forming layer so that the write gap layer has a recess that substantially replicates said recess formed by the top surface of the top first pole tip and the inclined edges of the forming layer; and forming a second pole piece with a ferromagnetic layer that has a second pole tip in the recess of the write gap layer so that the second pole tip has a bottom surface that substantially matches and is aligned with the top surface of the top first pole tip and has first and second inclined bottom edges that slope from the bottom surface of the second pole tip at said angle less than 90°.

56. A method as claimed in claim 55 wherein the second pole tip has vertical side edges that define a width W3 at the ABS that is 1–3 µm greater than the width W1 of the top first pole tip.

57. A method as claimed in claim 56 wherein said recess has a depth of 250–500 nm.

58. A method as claimed in claim 57 wherein the forming layer is $Al_2O_3$ and the top first pole tip comprises NiFe.

59. A method as claimed in claim 58 wherein, after forming and before lapping the forming layer, the forming layer has a top surface in a field laterally beyond the bottom first pole tip that is below the top surface of the top first pole tip.

60. A method as claimed in claim 59 wherein a thickness of the bottom first pole tip is 0.5 to 1.5 µm and a thickness of the bottom first pole tip is 2–5 µm.

61. A method as claimed in claim 60 wherein the write gap layer has a thickness of 0.1 to 0.5 µm.

62. A method as claimed in claim 61 wherein the top first pole tip is constructed of a higher magnetic moment material than a magnetic moment material of each of the bottom first pole tip and the second pole tip.

63. A method as claimed in claim 62 wherein the bottom first pole tip and the top first pole tip are $Ni_{80}Fe_{20}$ and the second pole tip is $Ni_{45}Fe_{55}$.

64. A method as claimed in claim 63 wherein, after forming the gap layer but before forming the second pole piece, the method includes the steps of:

forming a first insulation layer of an insulation stack on the second ferromagnetic layer;

forming at least one coil layer on the first insulation layer; and forming at least a second insulation layer of the insulation stack on said at least one coil layer.

65. An inverted magnetic write head comprising:

a first pole piece having a first component wherein the first component has a first surface and first and second edges that define a width W1 at the ABS;

the first pole piece having a second component on a portion of the first surface of the first component wherein the second component has a first surface and first and second edges that define a track width W2 of the head at the ABS;

a forming layer on another portion of the first surface of the first component adjacent the first and second edges of the second component and having a first surface spaced from the first surface of the second component in a direction away from the first surface of the first component;

the first surfaces of the second component and the forming layer forming a first recess with the first surface of the second component forming a bottom surface of the first recess;

a write gap layer in said first recess that has a second recess;

a second pole piece component in the second recess of the write gap layer with first and second edges that define a width W3 at the ABS.

66. A magnetic write head as claimed in claim 65 including:

the first recess having first and second sloping side surfaces that slope upwardly from the bottom surface of the first recess at an angle less than 90 degrees with respect to said bottom surface.

67. A magnetic write head as claimed in claim 65 wherein the first recess has a depth of 250–500 nm.

68. A magnetic write head as claimed in claim 65 wherein W1 is greater than W3 and W3 is greater than W2.

69. A magnetic write head as claimed in claim 68 wherein W3 is 1–3 µm greater than the width W2.

70. A magnetic write head as claimed in claim 65 wherein the forming layer is $Al_2O_3$ and the second component comprises NiFe.

71. A magnetic write head as claimed in claim 65 including:

the first pole piece having a third component that is connected to the first and second components and extends from the first and second components away from the ABS;

a first insulation layer of an insulation stack on the third component;

at least one coil layer on the first insulation layer; and at least a second insulation layer of an insulation stack on said at least one coil layer.

72. A magnetic write head as claimed in claim 65 including: wherein the first component has a thickness of 0.5 to 1.5 µm and the second component has a thickness of the 2–5 µm.

73. A magnetic write head as claimed in claim 65 wherein the second component is constructed of a higher magnetic moment material than a magnetic moment material of each of the first component and the second pole piece component.

74. A magnetic write head as claimed in claim 73 wherein the first component and the second pole piece component are substantially $Ni_{80}Fe_{20}$ and the second component is substantially $Ni_{45}Fe_{55}$.

75. A magnetic write head as claimed in claim 65 wherein the write gap layer has a thickness of 0.1 to 0.5 µm.

76. A magnetic write head as claimed in claim 65 including:

the bottom surface of the first recess having a width W4 at the ABS that is substantially equal to the width W2; and the second recess having a bottom surface that is substantially said width W4.

77. A magnetic write head as claimed in claim 76 including:

the first recess having first and second sloping side surfaces that slope upwardly from the bottom surface of the first recess at an angle less than 90 degrees with respect to said bottom surface.

78. A magnetic write head as claimed in claim 77 including: wherein the first recess has a depth of 250–500 nm.

79. A magnetic write head as claimed in claim 78 wherein W1 is greater than W3 and W3 is greater than W2.

80. A magnetic write head as claimed in claim 79 wherein W3 is 1–3 µm greater than the width W2.

81. A magnetic write head as claimed in claim 80 wherein the forming layer is $Al_2O_3$ and the second component comprises NiFe.

82. A magnetic write head as claimed in claim 81 including:

the first pole piece having a third component that is connected to the first and second components and extends from the first and second components away from the ABS;

a first insulation layer of an insulation stack on the third component;

at least one coil layer on the first insulation layer; and at least a second insulation layer of an insulation stack on said at least one coil layer.

83. A magnetic write head as claimed in claim 82 wherein the first component has a thickness of 0.5 to 1.5 µm and the second component has a thickness of the 2–5 µm.

84. A magnetic write head as claimed in claim 83 wherein the second component is constructed of a higher magnetic moment material than a magnetic moment material of each of the first component and the second pole piece component.

85. A magnetic write head as claimed in claim 84 wherein the first component and the second pole piece component are substantially $Ni_{80}Fe_{20}$ and the second component is substantially $Ni_{45}Fe_{55}$.

86. A magnetic write head as claimed in claim 85 wherein the write gap layer has a thickness of 0.1 to 0.5 µm.

87. An inverted magnetic write head that has an air bearing surface comprising:

a first pole piece with a first ferromagnetic layer that has a bottom first pole tip with first and second edges that define a width W1 at the ABS;

a first pole piece with a second ferromagnetic layer that has a top first pole tip located on the bottom first pole tip with a top surface partially bounded by first and second side edges that define a width W2 at the ABS;

the width W2 being less than the width W1 and defining a track width of the write head;

a non-magnetic, non-conductive second pole piece forming layer on the bottom first pole tip and having a top surface;

a recess formed by the top surface of the top first pole tip being recessed below the top surface of the forming layer and the forming layer having first and second inclined edges that slope upwardly from the top surface of the top first pole tip at an angle less than 90°;

a non-magnetic write gap layer on the top surface of the top first pole tip and on the inclined edges of the forming layer so that the write gap layer has a recess that substantially replicates said recess formed by the top surface of the top first pole tip and the inclined edges of the forming layer; and a second pole piece with a ferromagnetic layer that has a second pole tip in the recess of the write gap layer so that the second pole tip has a bottom surface that substantially matches and is aligned with the top surface of the top first pole tip and has first and second inclined bottom edges that slope from the bottom surface of the second pole tip at said angle less than 90°.

88. An inverted magnetic write head as claimed in claim 87 wherein the second pole tip has vertical side edges that define a width W3 at the ABS that is 1–3 µm greater than the width W1 of the top first pole tip.

89. An inverted magnetic write head as claimed in claim 87 wherein the forming layer is $Al_2O_3$ and the top first pole tip comprises NiFe.

90. An inverted magnetic write head as claimed in claim 87 wherein a thickness of the bottom first pole tip is 0.5 to 1.5 µm and a thickness of the top first pole tip is 2–5 µm.

91. An inverted magnetic write head as claimed in claim 87 wherein the write gap layer has a thickness of 0.1 to 0.5 µm.

92. An inverted magnetic write head as claimed in claim 87 wherein the top first pole tip is constructed of a higher magnetic moment material than a magnetic moment material of each of the bottom first pole tip and the second pole tip.

93. An inverted magnetic write head as claimed in claim 87 wherein the bottom first pole tip and the top first pole tip are $Ni_{80}Fe_{20}$ and the second pole tip is $Ni_{45}Fe_{55}$.

94. A magnetic write head as claimed in claim 87 including:

a first insulation layer of an insulation stack on the first ferromagnetic layer;

at least one coil layer on the first insulation layer; and at least a second insulation layer of the insulation stack on said at least one coil layer.

95. An inverted magnetic write head as claimed in claim 87 wherein said recess has a depth of 250–500 nm.

96. An inverted magnetic write head as claimed in claim 95 wherein the second pole tip has vertical side edges that define a width W3 at the ABS that is 1–3 µm greater than the width W1 of the top first pole tip.

97. An inverted magnetic write head as claimed in claim 96 wherein the forming layer is $Al_2O_3$ and the top first pole tip comprises NiFe.

98. An inverted magnetic write head as claimed in claim 97 wherein a thickness of the bottom first pole tip is 0.5 to 1.5 $\mu$m and a thickness of the top first pole tip is 2–5 $\mu$m.

99. An inverted magnetic write head as claimed in claim 98 wherein the write gap layer has a thickness of 0.1 to 0.5 $\mu$m.

100. An inverted magnetic write head as claimed in claim 99 wherein the top first pole tip is constructed of a higher magnetic moment material than a magnetic moment material of each of the bottom first pole tip and the second pole tip.

101. An inverted magnetic write head as claimed in claim 100 wherein the bottom first pole tip and the top first pole tip are $Ni_{80}Fe_{20}$ and the second pole tip is $Ni_{45}Fe_{55}$.

102. A magnetic write head as claimed in claim 101 including:
- a first insulation layer of an insulation stack on the first ferromagnetic layer;
- at least one coil layer on the first insulation layer; and
- at least a second insulation layer of the insulation stack on said at least one coil layer.

103. A combined magnetic read and write head comprising:
- a ferromagnetic first shield layer;
- a non-magnetic first read gap layer on the first shield layer;
- a sensor layer and first and second lead layers on the first read gap layer with the first and second lead layers connected to the sensor layer;
- a non-magnetic second read gap layer on the sensor layer and the first and second lead layers;
- a first pole piece with a first ferromagnetic layer that has a bottom first pole tip with a width W1 at the ABS;
- a first pole piece with a second ferromagnetic layer that has a top first pole tip located on the bottom first pole tip with a top surface partially bounded by first and second side edges that define a width W2 at the ABS;
- the width W2 being less than the width W1 and defining a track width of the write head;
- a non-magnetic, non-conductive second pole piece forming layer on the bottom first pole tip and having a top surface;
- a recess formed by the top surface of the top first pole tip being recessed below the top surface of the forming layer and the forming layer having first and second inclined edges that slope upwardly from the top surface of the top first pole tip at an angle less than 90°;
- a non-magnetic write gap layer on the top surface of the top first pole tip and on the inclined edges of the forming layer so that the write gap layer has a recess that substantially replicates said recess formed by the top surface of the top first pole tip and the inclined edges of the forming layer;
- a second pole piece layer with a ferromagnetic layer that has a second pole tip in the recess of the write gap layer so that the second pole tip has a bottom surface that substantially matches and is aligned with the top surface of the top first pole tip and has first and second inclined bottom edges that slope from the bottom surface of the second pole tip at said angle less than 90°;
- a first insulation layer of an insulation stack on the first ferromagnetic layer;
- at least one coil layer on the first insulation layer; and
- at least a second insulation layer of the insulation stack on said at least one coil layer.

104. A combined magnetic write head as claimed in claim 103 wherein the second pole tip has vertical side edges that define a width W3 at the ABS that is 1–3 $\mu$m greater than the width W1 of the second top first pole tip.

105. A combined magnetic write head as claimed in claim 103 wherein said recess has a depth of 250–500 nm.

106. A combined magnetic write head as claimed in claim 105 wherein the second pole tip has vertical side edges that define a width W3 at the ABS that is 1–3 $\mu$m greater than the width W1 of the top first pole tip.

107. A combined magnetic write head as claimed in claim 106 wherein the forming layer is $Al_2O_3$ and the top first pole tip comprises NiFe.

108. A combined magnetic write head as claimed in claim 107 wherein a thickness of the bottom first pole tip is 0.5 to 1.5 $\mu$m and a thickness of the top first pole tip is 2–5 $\mu$m.

109. A combined magnetic write head as claimed in claim 108 wherein the write gap layer has a thickness of 0.1 to 0.5 $\mu$m.

110. A combined magnetic write head as claimed in claim 109 wherein the top first pole tip is constructed of a higher magnetic moment material than a magnetic moment material of each of the bottom first pole tip and the second pole tip.

111. A combined magnetic write head as claimed in claim 110 wherein the bottom first pole tip and the top first pole tip are $Ni_{80}Fe_{20}$ and the second pole tip is $Ni_{45}Fe_{55}$.

112. A magnetic disk drive comprising:
- a combined magnetic read and write head including:
- a ferromagnetic first shield layer;
- a non-magnetic first read gap layer on the first shield layer;
- a sensor layer and first and second lead layers on the first read gap layer with the first and second lead layers connected to the sensor layer;
- a non-magnetic second read gap layer on the sensor layer and the first and second lead layers;
- a first pole piece with a first ferromagnetic layer that has a bottom first pole tip with a width W1 at the ABS;
- a first pole piece with a second ferromagnetic layer that has a top first pole tip located on the bottom first pole tip with a top surface partially bounded by first and second side edges that define a width W2;
- the width W2 being less than the width W1 and defining a track width of the write head;
- a non-magnetic, non-conductive second pole piece forming layer on the bottom first pole tip and having a top surface;
- a recess formed by the top surface of the top first pole tip being recessed below the top surface of the forming layer and the forming layer having first and second inclined edges that slope upwardly from the top surface of the top first pole tip at an angle less than 90°;
- a non-magnetic write gap layer on the top surface of the top first pole tip and on the inclined edges of the forming layer so that the write gap layer has a recess that substantially replicates said recess formed by the top surface of the top first pole tip and the inclined edges of the forming layer;
- a second pole piece layer with a ferromagnetic layer that has a second pole tip in the recess of the write gap layer so that the second pole tip has a bottom surface that substantially matches and is aligned with the top surface of the top first pole tip and has first and second inclined bottom edges that slope from the bottom surface of the second pole piece layer at said angle less than 90°;

a first insulation layer of an insulation stack on the first ferromagnetic layer;

at least one coil layer on the first insulation layer;

at least a second insulation layer of the insulation stack on said at least one coil layer;

a frame;

a magnetic disk rotatably supported on the frame;

a support mounted on the frame for supporting the head in a transducing relationship with the magnetic disk;

means for rotating the magnetic disk;

positioning means connected to the support for moving the head to multiple positions with respect to said magnetic disk; and means connected to the head, to the means for rotating the magnetic disk and to the positioning means for exchanging signals with the head, for controlling movement of the magnetic disk and for controlling the position of the head.

113. A magnetic disk drive as claimed in claim 112 wherein the second pole tip has vertical side edges that define a width W3 at the ABS that is 1–3 μm greater than the width W1 of the top first pole tip.

114. A magnetic disk drive as claimed in claim 112 wherein said recess has a depth of 250–500 nm.

115. A magnetic disk drive as claimed in claim 114 wherein the second pole tip has vertical side edges that define a width W3 at the ABS that is 1–3 μm greater than the width W1 of the top first pole tip.

116. A magnetic disk drive as claimed in claim 115 wherein the forming layer is $Al_2O_3$ and the top first pole tip comprises NiFe.

117. A magnetic disk drive as claimed in claim 116 wherein a thickness of the bottom first pole tip is 0.5 to 1.5 μm and a thickness of the top first pole tip is 2–5 μm.

118. A magnetic disk drive as claimed in claim 117 wherein the write gap layer has a thickness of 0.1 to 0.5 μm.

119. A magnetic disk drive as claimed in claim 118 wherein the top first pole tip is constructed of a higher magnetic moment material than a magnetic moment material of each of the bottom first pole tip and the second pole tip.

120. A magnetic disk drive as claimed in claim 119 wherein the bottom first pole tip and the top first pole tip are $Ni_{80}Fe_{20}$ and the second pole tip is $Ni_{45}Fe_{55}$.

* * * * *